United States Patent
Seok

(10) Patent No.: US 10,154,517 B2
(45) Date of Patent: Dec. 11, 2018

(54) METHOD FOR SENSING CHANNEL DYNAMICALLY IN WIRELESS LAN SYSTEM AND APPARATUS THEREFOR

(71) Applicant: LG Electronics Inc., Seoul (KR)

(72) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 259 days.

(21) Appl. No.: 14/888,139

(22) PCT Filed: Nov. 8, 2013

(86) PCT No.: PCT/KR2013/010123
§ 371 (c)(1),
(2) Date: Oct. 30, 2015

(87) PCT Pub. No.: WO2014/178502
PCT Pub. Date: Nov. 6, 2014

(65) Prior Publication Data
US 2016/0066349 A1      Mar. 3, 2016

Related U.S. Application Data

(60) Provisional application No. 61/887,431, filed on Oct. 6, 2013, provisional application No. 61/874,410, filed
(Continued)

(51) Int. Cl.
*H04W 24/02* (2009.01)
*H04W 74/08* (2009.01)
*H04W 84/12* (2009.01)

(52) U.S. Cl.
CPC ....... *H04W 74/0833* (2013.01); *H04W 24/02* (2013.01); *H04W 74/0808* (2013.01); *H04W 84/12* (2013.01)

(58) Field of Classification Search
CPC ............ H04W 24/02; H04W 74/0808; H04W 74/0833; H04W 84/12; H04W 48/16;
(Continued)

(56) References Cited

U.S. PATENT DOCUMENTS

2007/0060155 A1* 3/2007 Kahana ............... H04W 72/085
455/450
2008/0192644 A1   8/2008 Utsunomiya et al.
(Continued)

FOREIGN PATENT DOCUMENTS

CN      102264155 A    11/2011
CN      103053214 A     4/2013
(Continued)

OTHER PUBLICATIONS

M. Gong, Intel: "Medium Access for Wider Bandwidth", IEEE 802.11-10/1084r0, Sep. 12, 2010, XP017676203.
(Continued)

*Primary Examiner* — Benjamin Lamont
*Assistant Examiner* — Nizam Ahmed
(74) *Attorney, Agent, or Firm* — Dentons US LLP

(57) ABSTRACT

The present invention relates to a wireless communications system, and more particularly to a method for sensing a channel dynamically in a wireless LAN system and an apparatus therefor. A method for performing a back-off in a wireless LAN system according to an embodiment of the present invention includes the steps of performing CCA by applying clear channel assessment conditions in order to transmit a data unit with a different channel width, and performing a back-off based thereon.

14 Claims, 23 Drawing Sheets

Related U.S. Application Data on Sep. 6, 2013, provisional application No. 61/822,933, filed on May 14, 2013, provisional application No. 61/818,876, filed on May 2, 2013.

(58) Field of Classification Search
CPC ......... H04W 72/0453; H04W 72/0473; H04W 74/0816
USPC ........................................................ 370/338
See application file for complete search history.

(56) References Cited

U.S. PATENT DOCUMENTS

| | | |
|---|---|---|
| 2011/0096747 A1 | 4/2011 | Seok |
| 2011/0292919 A1 | 12/2011 | Trainin et al. |
| 2012/0044879 A1 | 2/2012 | Park |
| 2012/0155295 A1 | 6/2012 | Trainin |
| 2012/0327870 A1* | 12/2012 | Grandhi ................ H04W 28/06 370/329 |
| 2014/0079016 A1* | 3/2014 | Dai ...................... H04L 5/0041 370/329 |
| 2015/0131641 A1* | 5/2015 | Ong ...................... H04W 48/20 370/338 |

FOREIGN PATENT DOCUMENTS

| | | |
|---|---|---|
| JP | 2010193446 | 9/2010 |
| KR | 1020090098888 | 9/2009 |
| KR | 100946234 | 3/2010 |
| KR | 1020100077919 | 7/2010 |
| KR | 1020110111228 | 10/2011 |
| WO | 2006109213 A1 | 10/2006 |
| WO | 2012/006035 A2 | 1/2012 |
| WO | 2012/027292 A1 | 3/2012 |
| WO | 2012/064502 A1 | 5/2012 |

OTHER PUBLICATIONS

M. Park, Intel: "IEEE 802.11ac: Dynamic Bandwidth Channel Access", XP031908841.

Hart, et al.: "Improved CCA for 80 and 160 MHz BSSs", IEEE 802.11-10/0744r1, Jul. 2010.

* cited by examiner

METHOD FOR SENSING CHANNEL DYNAMICALLY IN WIRELESS LAN SYSTEM AND APPARATUS THEREFOR

This application is a 35 USC § 371 National Stage entry of International Application No. PCT/KR2013/010123 filed on Nov. 8, 2013, and claims priority to U.S. Provisional Application Nos. 61/818,876 filed on May 2, 2013; 61/822,933 filed on May 14, 2013; 61/874,410 filed on Sep. 6, 2013 and 61/887,431 filed on Oct. 6, 2013, all of which are hereby incorporated by reference in their entireties as if fully set forth herein.

TECHNICAL FIELD

The present disclosure relates to a wireless competition system and, more particularly, to a method for sensing a channel dynamically in a wireless LAN system.

BACKGROUND ART

With recent development of information communication technologies, a variety of wireless communication technologies have been developed. From among such technologies, WLAN is a technology that allows wireless access to the Internet at home, in businesses, or in specific service providing areas using a mobile terminal, such as a personal digital assistant (PDA), a laptop computer, and a portable multimedia player (PMP), based on radio frequency technology.

In order to overcome limited communication speed, which has been pointed out as a weak point of WLAN, technical standards have recently introduced a system capable of increasing the speed and reliability of a network while extending a coverage region of a wireless network. For example, IEEE 802.11n supports high throughput (HT) with a maximum data processing speed of 540 Mbps. In addition, Multiple Input and Multiple Output (MIMO) technology, which employs multiple antennas for both a transmitter and a receiver in order to minimize transmission errors and to optimize data rate, has been introduced.

DISCLOSURE

Technical Problem

Machine-to-machine (M2M) communication technology has been discussed as a next generation communication technology. Technical standard to support M2M communications in the IEEE 802.11 WLAN system is also under development as IEEE 802.11ah. In M2M communications, a scenario in which occasional transmission/reception of a small amount of data at a low speed in an environment including a large number of devices may be considered.

An object of the present invention devised to solve the problem lies in a new backoff method including the operation of determining whether or not a wireless medium (WM) is busy/idle by applying a proper parameter according to the situation.

Objects of the present invention are not limited to the aforementioned objects, and other objects of the present invention which are not mentioned above will become apparent to those having ordinary skill in the art upon examination of the following description.

Technical Solution

The object of the present invention can be achieved by providing a method for performing backoff in a wireless LAN (WLAN) system, the method comprising performing, when transmission of a data unit having a size greater than or equal to a first channel width is intended, a first backoff process on a first primary channel having a size of a second channel width less than or equal to the first channel width, using a first clear channel assessment (CCA) condition, performing, when transmission of a data unit having a size greater than or equal to a third channel width is intended, a second backoff process on a second primary channel having a size of a fourth channel width less than or equal to the third channel width, using a second CCA condition, and transmitting, when a transmission opportunity (TXOP) is allowed as a result of the first backoff process, the data unit having the size greater than or equal to the first channel width and transmitting, when the TXOP is allowed as a result of the second backoff process, the data unit having the size greater than or equal to the third channel width.

In another aspect of the present invention, provided herein is a station for performing backoff in a wireless LAN (WLAN) system, the station including a transceiver, and a processor, wherein the processor may be configured to perform, when transmission of a data having a size greater than or equal to a first channel width is intended, a first backoff process on a first primary channel having a size of a second channel width less than or equal to the first channel width, using a first clear channel assessment (CCA) condition, perform, when transmission of a data unit having a size greater than or equal to a third channel width is intended, a second backoff process on a second primary channel having a size of a fourth channel width less than or equal to the third channel width, using a second CCA condition, and transmit, when a transmission opportunity (TXOP) is allowed as a result of the first backoff process, the data unit having the size greater than or equal to the first channel width and transmit, when the TXOP is allowed as a result of the second backoff process, the data unit having the size greater than or equal to the third channel width.

Embodiments according to the above aspects of the present invention may include the following details in common.

The third channel width may be greater than the first channel width, a second CCA threshold corresponding to the second CCA condition may be higher than a first CCA threshold correspond to the first CCA condition.

The first CCA threshold may be A dBm, and the second CCA threshold may be A+3 dBm.

When a signal greater than or equal to the first CCA threshold is detected on the first primary channel, it may be determined that the first primary channel is in a BUSY state. In addition, when a signal greater than or equal to the second CCA threshold is detected on the second primary channel, it may be determined that the second primary channel is in the BUSY state.

When the first primary channel is in an idle state, a value of a backoff timer of the first backoff process may decrease in each backoff slot. In addition, when the second primary channel is in the idle state, a value of a backoff timer of the second backoff process may decrease in each backoff slot.

Allowing the TXOP as a result of the first backoff process may include the value of the backoff timer of the first backoff process reaching 0. Allowing the TXOP as a result of the second backoff process may include the value of the backoff timer of the second backoff process reaching 0.

When the TXOP is allowed as a result of the first backoff process, transmission of the data unit having the size greater than or equal to the first channel width may be performed according to the idle state of one or more secondary channels. In addition, when the TXOP is allowed as a result of the second backoff process, transmission of the data unit having the size greater than or equal to the third channel width may be performed according to the idle state of one or more secondary channels.

When the TXOP is allowed as a result of the first backoff process, and the one or more secondary channels are in the BUSY state, a new backoff process may be performed.

The second channel width may be a part of the first channel width, and the fourth channel width may be a part of the third channel width.

The first channel width may be W MHz, 2 W MHz, 4 W MHz, or 8 W MHz, and the second channel width may be W MHz.

The third channel width may be 2 W MHz, 4 W MHz, or 8 W MHz, and the fourth channel width may be W MHz.

The data unit may be a Physical Layer Convergence Protocol (PLCP) Packet Data Unit (PPDU).

The above general description and following detailed description of the present invention are exemplarily given to supplement the recitations in the claims.

Advantageous Effects

According to an embodiment of the present invention, a new backoff method including the operation of determining whether or not a wireless medium (WM) is busy/idle by applying a proper parameter according to the situation and an apparatus for the same may be provided.

The effects that can be obtained from the present invention are not limited to the aforementioned effects, and other effects may be clearly understood by those skilled in the art from the descriptions given below.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
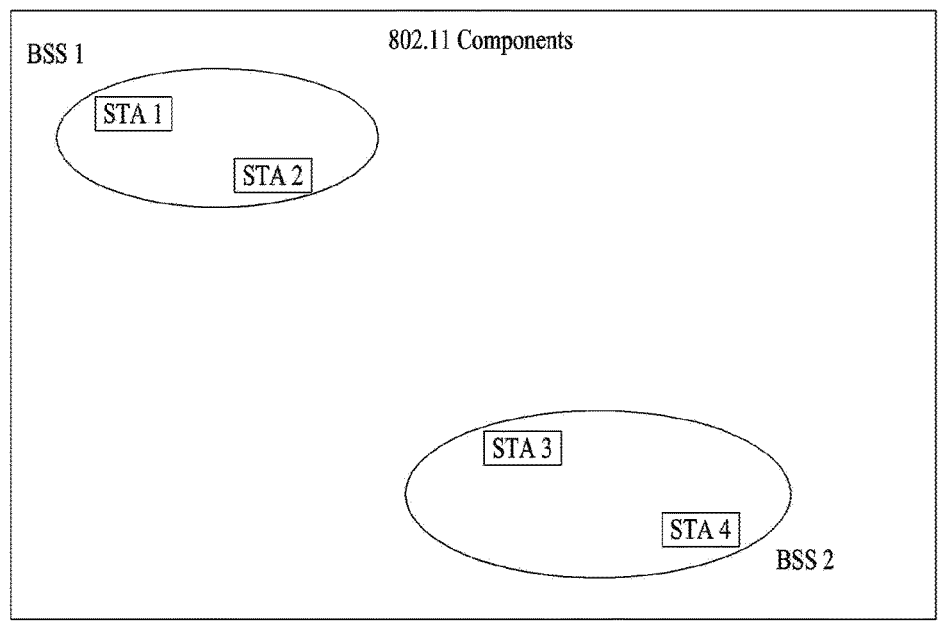
FIG. 1 is a diagram showing an exemplary structure of an IEEE 802.11 system to which the present invention is applicable.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3GPP, 3GPP LTE, LTE-A, and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

Configuration of WLAN System

FIG. 1 illustrates an exemplary configuration of an IEEE 802.11 system to which the present invention is applicable.

IEEE 802.11 can be composed of a plurality of components and provide a WLAN supporting STA mobility transparent for higher layers according to interaction of the components. A basic service set (BSS) may correspond to a basic component block in an IEEE 802.11 LAN. FIG. 1 shows 2 BSSs (BSS1 and BSS2) each of which includes 2 STAs as members (STA1 and STA2 being included in BSS1 and STA3 and STA4 being included in BSS2). In FIG. 1, an oval that defines a BSS indicates a coverage area in which STAs belonging to the corresponding BSS perform communication. This area may be called a basic service area (BSA). When an STA moves out of the BSA, the STA cannot directly communicate with other STAs in the BSA.

A most basic BSS in the IEEE 802.11 LAN is an independent BSS (IBSS). For example, the IBSS can have a minimum configuration including only 2 STAs. The IBSS has a simplest form and corresponds to the BSS (BSS1 or BSS2) shown in FIG. 1, in which components other than STA are omitted. This configuration is possible when STAs can directly communicate with each other. This type of LAN can be configured as necessary rather than being previously designed and configured and may be called an ad-hoc network.

When an STA is turned on or off, or enters or exits the coverage of a BSS, membership of the STA in the BSS can be dynamically changed. To become a member of the BSS, the STA can join the BSS using a synchronization process. To access all services based on the BSS, the STA needs to associate with the BSS. Association may be dynamically set and may use a distribution system service (DSS).

Figure 2:
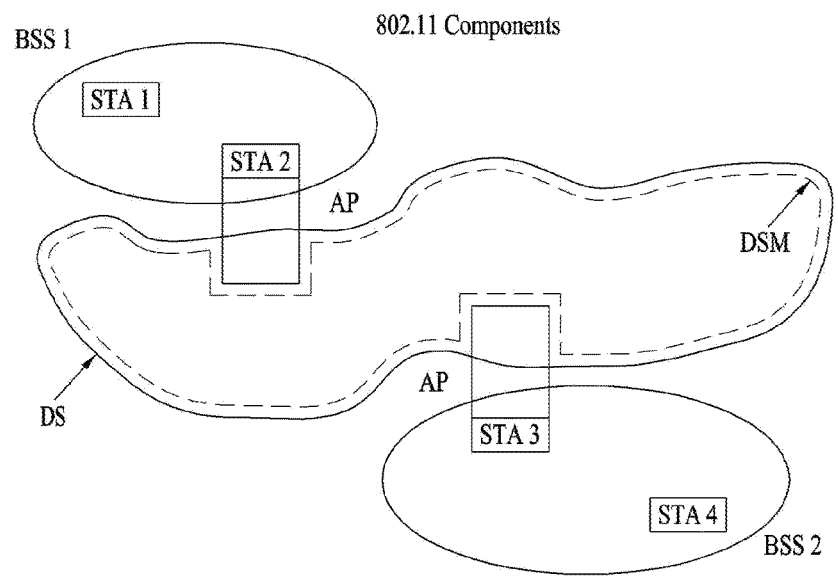
FIG. 2 is a diagram showing another exemplary structure of an IEEE 802.11 system to which the present invention is applicable.

FIG. 2 illustrates another exemplary configuration of an IEEE 802.11 system to which the present invention is applicable. FIG. 2 shows a distribution system (DS), a distribution system medium (DSM) and an access point (AP) in addition to the configuration of FIG. 1.

In a LAN, a direct station-to-station distance may be limited by PHY performance. While this distance limit can be sufficient in some cases, communication between stations having a long distance therebetween may be needed in some cases. The DS may be configured to support an extended coverage.

The DS refers to a structure in which BSSs are connected to each other. Specifically, BSSs may be present as components of an extended form of a network composed of a plurality of BSSs rather than being independently present as shown in FIG. 1.

The DS is a logical concept and may be specified by characteristics of the DSM. IEEE 802.11 logically discriminates a wireless medium (WM) from the DSM. The logical media are used for different purposes and used by different components. IEEE 802.11 does not limit the media as the same medium or different media. The fact that plural media are logically different from each other can explain flexibility of IEEE 802.11 LAN (DS structure or other network structures). That is, the IEEE 802.11 LAN can be implemented in various manners and physical characteristics of implementations can independently specify corresponding LAN structures.

The DS can support mobile devices by providing seamless integration of a plurality of BSSs and logical services necessary to handle addresses to a destination.

The AP refers to an entity that enables associated STAs to access the DS through a WM and has STA functionality. Data can be transmitted between a BSS and the DS through the AP. For example, STA2 and STA3 shown in FIG. 2 have STA functionality and provide a function of enabling associated STAs (STA1 and STA4) to access the DS. Furthermore, all APs are addressable entities because they basically correspond to an STA. An address used by an AP for communication on the WM is not necessarily equal to an address used by the AP for communication on the DSM.

Data transmitted from one of STAs associated with an AP to an STA address of the AP can be received at an uncontrolled port at all times and processed by an IEEE 802.1X port access entity. Furthermore, the transmitted data (or frame) can be delivered to the DS when a controlled port is authenticated.

Figure 3:
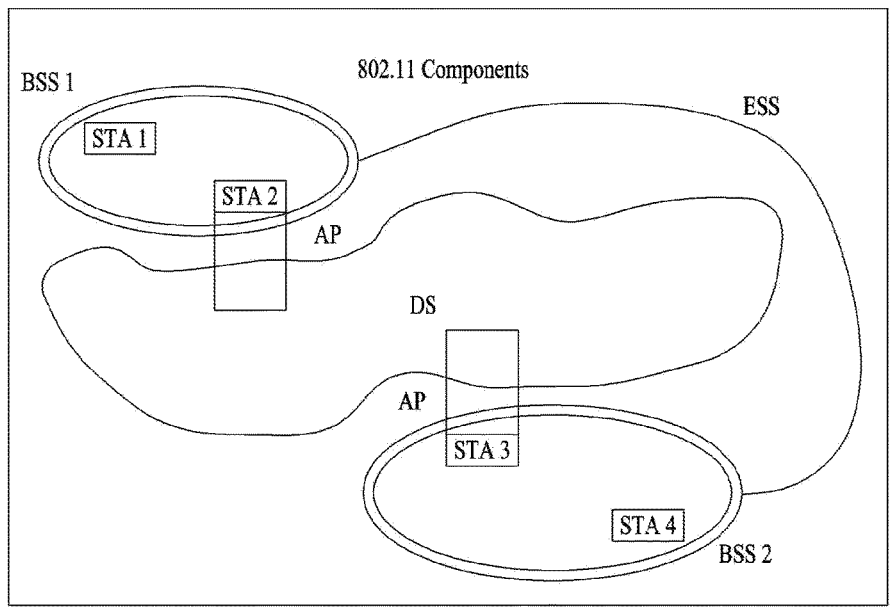
FIG. 3 is a diagram showing still another exemplary structure of an IEEE 802.11 system to which the present invention is applicable.

FIG. 3 illustrates another exemplary configuration of an IEEE 802.11 system to which the present invention is applicable. FIG. 3 shows an extended service set (ESS) for providing an extended coverage in addition to the configuration of FIG. 2.

A wireless network having an arbitrary size and complexity may be composed of a DS and BSSs. This type of network is called an ESS network in IEEE 802.11. The ESS may correspond to a set of BSSs connected to a DS. However, the ESS does not include the DS. The ESS network looks like an IBSS network at a logical link control (LLC) layer. STAs belonging to the ESS can communicate with each other and mobile STAs can move from a BSS to another BSS (in the same ESS) transparently to LCC.

IEEE 802.11 does not define relative physical positions of BSSs in FIG. 3 and the BSSs may be located as follows. The BSSs can partially overlap, which is a structure normally used to provide continuous coverage. The BSSs may not be physically connected to each other and there is a limit on the logical distance between the BSSs. In addition, the BSSs may be physically located at the same position in order to provide redundancy. Furthermore, one (or more) IBSS or ESS networks may be physically located in the same space as one (or more ESS) network. This may correspond to an ESS network form when an ad-hoc network operates in the location of the ESS network, IEEE 802.11 networks, which physically overlap, are configured by different organizations or two or more different access and security policies are needed at the same position.

Figure 4:
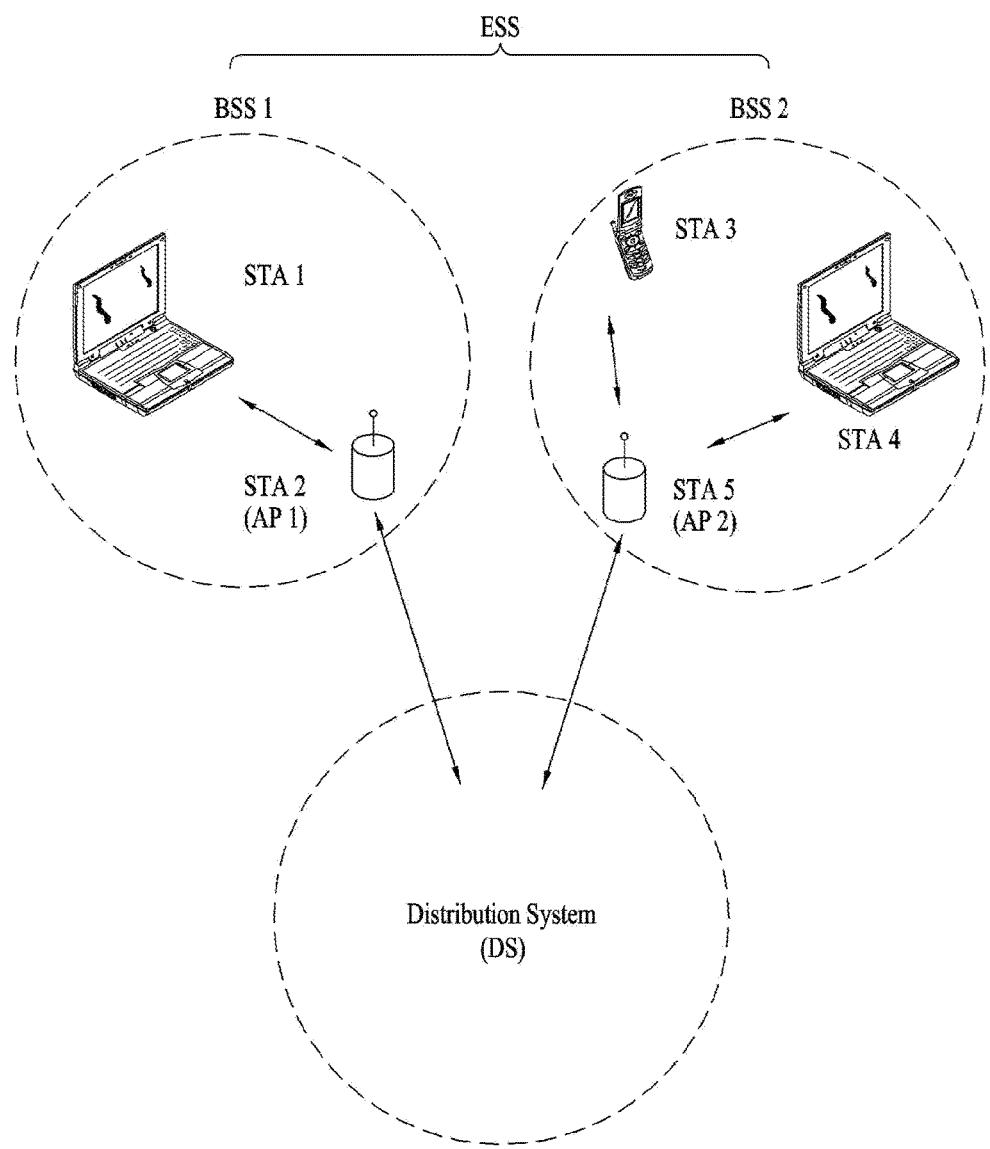
FIG. 4 is a diagram showing an exemplary structure of a WLAN system.

FIG. 4 illustrates an exemplary configuration of a WLAN system. FIG. 4 shows an example of a BSS based on a structure including a DS.

In the example of FIG. 4, BSS1 and BSS2 constitute an ESS. In the WLAN system, STAs are devices operating according to MAC/PHY regulations of IEEE 802.11. The STAs include an AP STA and a non-AP STA. The non-AP STA corresponds to a device directly handled by a user, such as a laptop computer, a cellular phone, etc. In the example of FIG. 4, STA1, STA3 and STA4 correspond to the non-AP STA and STA2 and STA5 correspond to the AP STA.

In the following description, the non-AP STA may be called a terminal, wireless transmit/receive unit (WTRU), user equipment (UE), mobile station (MS), motile terminal, mobile subscriber station (MSS), etc. The AP corresponds to a base station (BS), node-B, evolved node-B, base transceiver system (BTS), femto BS, etc. in other wireless communication fields.

Layer Structure

Operation of an STA in the WLAN system may be described in terms of layer structure. The layer structure may be implemented by the processor in terms of apparatus configuration. The STA may have a plurality of layer structures. For example, layer structures mainly discussed in 802.11 standard document includes a PHY and a MAC sublayer on a data link layer (DLL). The PHY may include a physical layer convergence procedure (PLCP) entity and a physical medium dependent (PMD) entity. The MAC sublayer and the PHY conceptually include management entities called a MAC sublayer management entity (MLME) and a physical layer management entity (PLME). These entities provide layer management service interfaces on which the layer management function is performed.

To provide an accurate MAC operation, a station management entity (SME) is present in each STA. The SME may is a layer-independent entity which may be viewed as being present in a separate management plane or off to the side. The accurate functions of the SME, which will not be described in detail in this specification, may be generally viewed as serving to collect layer-dependent statuses from various layer management entities (LME) and to set layer-specific parameters to similar values. Generally, the SME may perform these functions on behalf of a typical system management entity and implement a standard management protocol.

The entities described above interact with each other in various manners. For example, the entities may interact with each other by exchanging GET/SET primitives. The term primitive as used herein refers to a set of elements or parameters related to a specific purpose. The XX-GET.request primitive is used to recast the value of a given MIB attribute (management information-based attribute information). If the Status in the XX-GET.confirm primitive is "SUCCESS", the XX-GET.confirm primitive returns a proper MIB attribute information value. Otherwise, the XX-GET.confirm primitive is used to return an error indication through the Status field. The XX-SET.request primitive is used to request that a designated MIB attribute be set to a given value. If this MIB attribute indicates a specific operation, the XX-SET.request primitive requests that the specific operation be performed. If the Status in the XX-SET.confirm primitive is "SUCCESS", the XX-SET.confirm primitive indicates that the designated MIB attribute has been set to the requested value. Otherwise, the XX-SET.confirm primitive is used return an error condition to the status field. If the MIB attribute indicates a specific operation, this primitive confirms that the specific operation has been performed.

The MLME and the SME may exchange various MLME_GET/SET primitives via MLME_Service Access Point (MLME_SAP). In addition, various PLME_GET/SET primitives may be exchanged between the PLME and the SME via PLME_SAP and between the MLME and the PLME via MLME-PLME_SAP.

Link Setup Process

Figure 5:
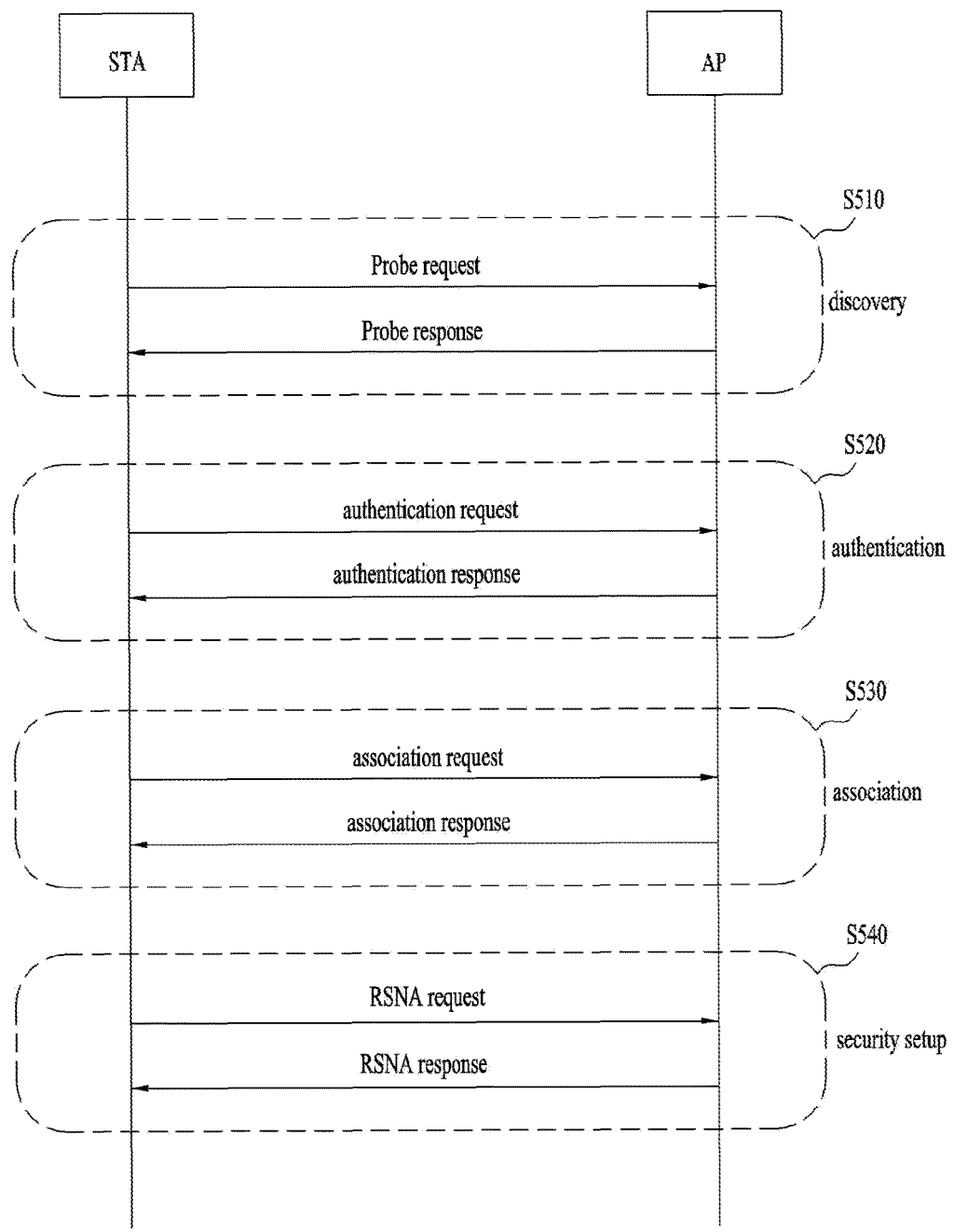
FIG. 5 illustrates a link setup process in a WLAN system.

FIG. 5 illustrates a typical link setup process in a WLAN system to which the present invention is applicable.

In order to set up a link on the network and transmit/receive data over the network, the STA should perform network discovery and authentication, establish association, and perform an authentication procedure for security. The link setup process may also be referred to as a session initiation process or a session setup process. In addition, the discovery, authentication, association, and security setup steps in the link setup process may be collectively called an association step.

Hereinafter, an exemplary link setup process will be described with reference to FIG. 5.

In step S510, the STA may perform the network discovery operation. The network discovery operation may include a scanning operation of the STA. That is, the STA needs to search for an available network so as to access the network. The STA needs to identify a compatible network before participating in a wireless network. Herein, the process of identifying a network present in a specific region is referred to as scanning.

The scanning operation is classified into active scanning and passive scanning.

FIG. 5 exemplarily shows the network discovery operation including the active scanning process. In the case of the active scanning, the STA configured to perform scanning transmits a probe request frame and waits for a response to the probe request frame, in order to move between channels and search for APs present nearby. A responder transmits a probe response frame to the STA having transmitted the probe request frame, in response to the probe request frame. Herein, the responder may be the last STA that has transmitted a beacon frame in a BSS of the scanned channel. In the BSS, since the AP transmits a beacon frame, the AP serves as the responder. In the IBSS, STAs within the IBSS transmit a beacon frame in rotation, and thus the responder is fixed. For example, an STA that has transmitted the probe request frame on Channel #1 and has received the probe response frame on Channel #1 may store BSS-associated information contained in the received probe response frame and move to the next channel (for example, Channel #2) to perform scanning (i.e., transmission/reception of a probe request/response frame on Channel #2) in the same manner.

Although not shown in FIG. 5, the passive scanning operation may be performed. In performing the passive scanning operation, an STA to perform scanning waits for a beacon frame, moving from one channel to another. The beacon frame, which is one of the management frames in IEEE 802.11, is periodically transmitted to indicate presence of a wireless network and to allow the STA performing scanning to discover a wireless network to participate in the wireless network. In the BSS, the AP serves to periodically transmit the beacon frame. In the IBSS, STAs of the IBSS transmit a beacon frame in rotation. If an STA performing scanning receives the beacon frame, the STA stores information about the BSS contained in the beacon frame, and then moves to another channel and records beacon frame information. The STA having received the beacon frame may store BSS-related information contained in the received beacon frame, move to the next channel, and then perform scanning in the same manner.

In comparison between active scanning and passive scanning, active scanning is more advantageous than passive scanning in terms of delay and power consumption.

After the STA discovers the network, the STA may perform authentication in step S520. This authentication process may be referred to as first authentication in order to distinguish the authentication process from the security setup operation of step S540, which will be described later.

The authentication process includes transmitting, by the STA, an authentication request frame to an AP and transmitting, by the AP, an authentication response frame to the STA in response to the authentication request frame. The authentication frames used for authentication request/response may correspond to management frames.

The authentication frame may include information about an authentication algorithm number, an authentication transaction sequence number, a status code, a challenge text, a robust security network (RSN), a finite cyclic group, etc. This information, which is an example of information that may be contained in the authentication request/response frame, may be replaced with other information or include additional information.

The STA may transmit an authentication request frame to the AP. The AP may determine whether to authenticate the STA on the basis of the information contained in the received authentication request frame. The AP may provide an authentication result to the STA through the authentication response frame.

After the STA is successfully authenticated, the association process may be conducted in step S530. The association process may include the steps of transmitting, by the STA, an association request frame to the AP and transmitting, by the AP, an association response frame to the STA in response.

For example, the association request frame may include information related to various capabilities, a beacon listen interval, a service set identifier (SSID), supported rates, supported channels, RSN, mobility domain, supported operating classes, a traffic indication map (TIM) broadcast request, an interworking service capability, and the like.

For example, the association response frame may include information related to various capabilities, a status code, an association ID (AID), supported rates, an enhanced distributed channel access (EDCA) parameter set, a received channel power indicator (RCPI), a received signal to noise indicator (RSNI), mobility domain, a timeout interval (association comeback time), an overlapping BSS scan parameter, a TIM broadcast response, a QoS map, and the like.

The aforementioned information, which is simply an example of some parts of information which can be contained in the association request/response frame, may be replaced with other information or include additional information.

After the STA is successfully associated with the network, the security setup process may be performed in step S540. The security setup process of step S540 may be referred to as an authentication process based on a robust security network association (RSNA) request/response. The authentication process of step S520 may be referred to as a first authentication process, and the security setup process of step S540 may be simply referred to as an authentication process.

The security setup process of step S540 may include, for example, a private key setup process through 4-way handshaking in an extensible authentication protocol over LAN (EAPOL) frame. In addition, the security setup process may also be performed according to another security scheme which is not defined in IEEE 802.11 standards.

Evolution of WLAN

The IEEE 802.11 WLAN standard provides the transfer rate of 11 Mbps (IEEE 802.11b) or 54 Mbps (IEEE 802.11a) using an unlicensed band in 2.4 GHz or 5 GHz. IEEE 802.11g provides a transfer rate of 54 Mbps by applying OFDM in 2.4 GHz.

In order to overcome a limit in WLAN communication speed, IEEE 802.11n has recently been established as a communication standard. IEEE 802.11n aims to increase network speed and reliability as well as to extend a coverage region of the wireless network. More specifically, IEEE 802.11n supports a high throughput (HT) of a maximum data processing speed greater than or equal to 540 Mbps, and is based on multiple input and multiple output (MIMO) technology in which multiple antennas are used at both a transmitter and a receiver. This, IEEE 802.11n provides a transfer rate of 300 Mbps for four spacious streams by applying MIMO-OFDM. IEEE 802.11n supports a channel bandwidth up to 40 MHz. In this case, IEEE 802.11n provides a transfer rate of 600 Mbps.

With widespread use of the WLAN technology and diversification of WLAN applications, there has been a need for development a new WLAN system capable of supporting higher HT than a data processing speed supported by IEEE 802.11n. The next generation WLAN system for supporting very high throughput (VHT) is the next version (for example, IEEE 802.11ac) of the IEEE 802.11n WLAN system, and is one of IEEE 802.11 WLAN systems recently proposed to support a data processing speed greater than or equal to 1 Gbps at an MAC service access point (MAC SAP). To this end, the VHT system supports a channel bandwidth of 80 MHz or 160 MHz and up to 8 spatial streams. If the 160 MHz channel bandwidth, 8 spatial streams, 256 Quadrature Amplitude Modulation (QAM), a short guard interval (GI) are all implemented, a maximum of 6.9 Gbps is provided as a transfer rate.

In order to efficiently utilize a radio frequency channel, the next generation WLAN system supports a Multi User Multiple Input Multiple Output (MU-MIMO) transmission scheme in which a plurality of STAs are allowed to access a channel simultaneously. In accordance with the MU-MIMO transmission scheme, the AP may simultaneously transmit packets to at least one MIMO-paired STA.

In addition, a technology for supporting WLAN system operations in whitespace is under discussion. For example, introduction of the WLAN system in TV whitespace (TV WS) such as a frequency band (e.g., a band between 54 MHz and 698 MHz) left idle due to transition from analog TV to digital TV is under discussion in the IEEE 802.11af standard. However, this is simply illustrative, and the whitespace may be viewed as a licensed band which is primarily usable by a licensed user. The licensed user means a user who has permission to use the licensed band, and may also be referred to as a licensed device, a primary user, an incumbent user, or the like.

For example, an AP and/or STA operating in the whitespace (WS) should provide a function of protecting the licensed user. For example, in the case in which a licensed user such as a microphone is already using a specific WS channel which is in a frequency band divided according to a regulation so as to have a specific bandwidth in the WS band, the AP and/or STA are not allowed to use the frequency band corresponding to the WS channel in order to protect the licensed user. In addition, the AP and/or STA should stop using a frequency band for transmission and/or reception of a current frame if the licensed user uses this frequency band.

Accordingly, the AP and/or STA needs to pre-check whether use of a specific frequency band within the WS band is possible, namely whether a licensed user is in the frequency band. Checking whether a licensed user is in the specific frequency band is referred to as spectrum sensing. An energy detection scheme, a signature detection scheme and the like are utilized as the spectrum sensing mechanisms. The AP and/or STA may determine that a licensed user is using the specific frequency band if the intensity of a received signal exceeds a predetermined value, or a DTV preamble is detected.

Machine-to-machine (M2M) communication technology is under discussion as a next generation communication technology. Technical standard IEEE 802.11ah for supporting M2M communication in the IEEE 802.11 WLAN system is also under development. M2M communication, which represents a communication scheme involving one or more machines, may be referred to as machine type communication (MTC) or machine-to-machine (M2M) communication. Herein, the machine may represent an entity that does not require direct manipulation from or intervention of a user. For example, not only a meter or vending machine equipped with a wireless communication module, but also user devices such as a smartphone which is capable of performing communication by automatically accessing the network without manipulation/intervention by the user may be an example of the machines. M2M communication may include device-to-device (D2D) communication and communication between a device and an application server. Examples of communication between a device and an application server may include communication between a vending machine and a server, communication between a Point of Sale (POS) device and a server, and communication between an electric meter, a gas meter or a water meter and a server. Additionally, M2M communication-based applications may include security, transportation and healthcare applications. Considering the characteristics of the aforementioned application examples, M2M communication needs to support occasional transmission/reception of a small amount of data at a low speed in an environment including a large number of devices.

Specifically, M2M communication needs to support a large number of STAs. While the current WLAN system assumes that one AP is associated with up to 2007 STAs, various methods to support other cases in which many more STAs (e.g., about 6000 STAs) are associated with one AP have been discussed regarding M2M communication. In addition, it is expected that there will be many applications to support/require a low transfer rate in M2M communication. In order to smoothly support many STAs, an STA in the WLAN system may recognize presence or absence of data to be transmitted thereto on the basis of a traffic indication map (TIM), and several methods to reduce the bitmap size of the TIM have been under discussion. In addition, it is expected that there will be much traffic data having a very long transmission/reception interval in M2M communication. For example, in M2M communication, a very small amount of data such as electric/gas/water metering is required to be transmitted and received at long intervals (for example, every month). Accordingly, there have been discussions about methods to efficiently support the case in which a very small number of STAs have a data frame to receive from the AP during one beacon period while the number of STAs to be associated with one AP increases in the WLAN system.

As described above, WLAN technology is rapidly evolving, and not only the aforementioned exemplary techniques but also other techniques for direct link setup, improvement of media streaming throughput, support of high-speed and/or large-scale initial session setup, and support of an extended bandwidth and operation frequency are under development.

Medium Access Mechanism

In the IEEE 802.11-based WLAN system, a basic access mechanism of medium access control (MAC) is a Carrier Sense Multiple Access with Collision Avoidance (CSMA/CA) mechanism. The CSMA/CA mechanism, which is also called a Distributed Coordination Function (DCF) of IEEE 802.11 MAC, basically employs a "listen before talk" access mechanism. In accordance with this access mechanism, the AP and/or STA may perform Clear Channel Assessment (CCA) of sensing a radio frequency channel or medium in a predetermined time interval (e.g., DCF Inter-Frame Space (DIFS), prior to data transmission. When it is determined in the sensing that the medium is in the idle state, frame transmission begins through the medium. On the other hand, when it is sensed that the medium is in the busy state, the AP and/or STA does not start transmission, but establishes a delay time (e.g., a random backoff period) for medium access, and attempts to perform frame transmission after waiting during the period. Through application of a random backoff period, it is expected that multiple STAs will attempt to start frame transmission after waiting for different times, resulting in minimized collision.

In addition, the IEEE 802.11 MAC protocol provides a hybrid coordination function (HCF). The HCF is based on the DCF and the point coordination function (PCF). The PCF refers to a polling-based synchronous access scheme in which polling is periodically executed to allow all reception APs and/or STAs to receive a data frame. In addition, the HCF includes enhanced distributed channel access (EDCA) and HCF controlled channel access (HCCA). EDCA is achieved when the access scheme provided to multiple users by a provider is based on contention. HCCA is achieved in the contention-free channel access scheme which employs the polling mechanism. In addition, the HCF includes a medium access mechanism for improving Quality of Service (QoS) of the WLAN, and may transmit QoS data during both the contention period (CP) and the contention free period (CFP).

Figure 6:
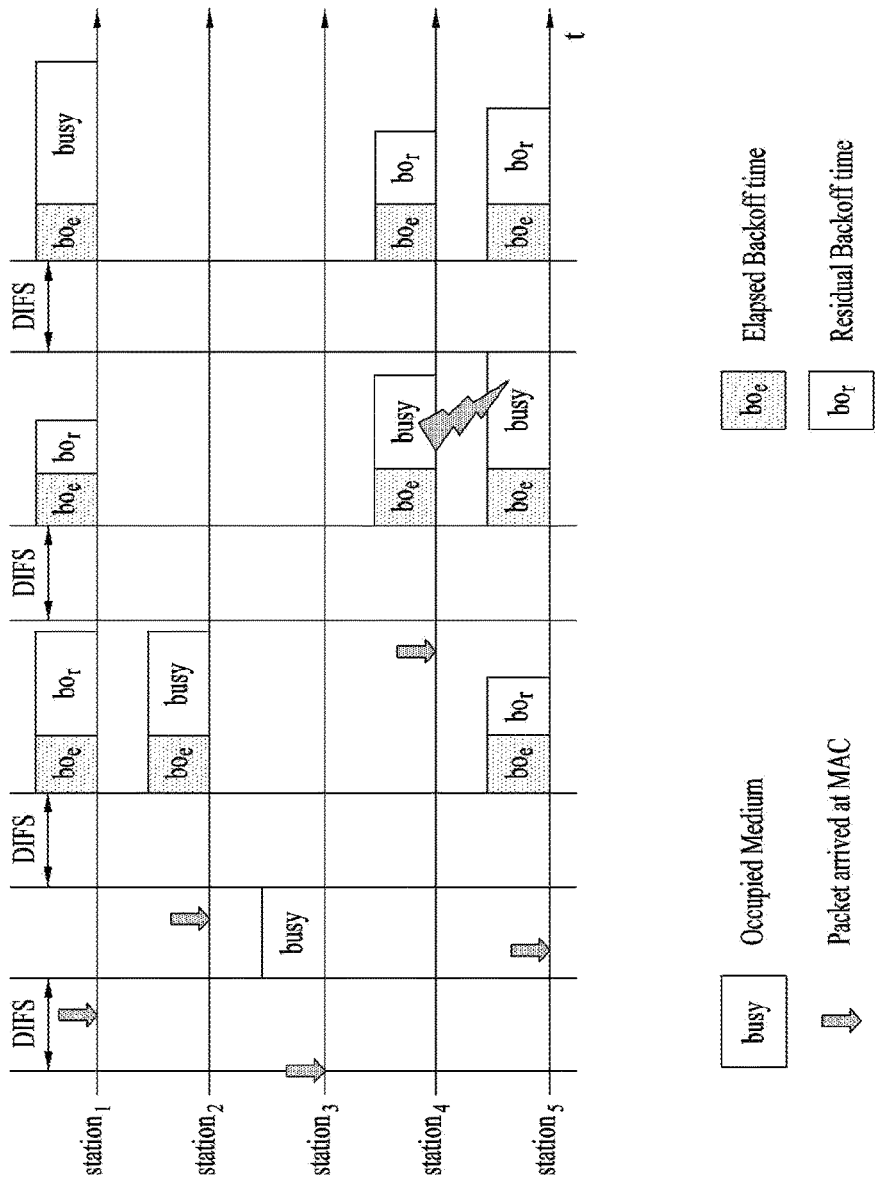
FIG. 6 illustrates a backoff process.

FIG. 6 illustrates a backoff process.

Hereinafter, operations based on a random backoff period will be described with reference to FIG. 6. If a medium is switched from the busy or busy state to the idle state, several STAs may attempt to transmit data (or frames). In a method to minimize collisions, each STA selects a random backoff count, waits for a slot time corresponding to the selected backoff count, and then attempts to start transmission. The random backoff count has a value of a pseudo-random integer, and may be set to a value in a range between 0 and CW. Herein, CW is a contention window parameter value. Although the CW parameter is given CWmin as the initial value, the initial value may be doubled if transmission fails (for example, if ACK of the transmission frame is not received). If the CW parameter value is CWmax, CWmax is maintained until data transmission is successful, and at the same time data transmission may be attempted. If data transmission is successful, the CW parameter value is reset to CWmin. Preferably, the values of CW, CWmin, and CWmax are set to $2^n-1$ (where n=0, 1, 2, . . . ).

Once the random backoff process begins, the STA continuously monitors the medium while counting down the backoff slot according to a determined backoff count value. If the medium is monitored as being in the busy state, the STA stops countdown and waits for a predetermined time. If the medium is in the idle state, the remaining countdown restarts.

In the example shown in FIG. 6, if a packet for STA3 to transmit reaches MAC of STA3, the STA3 may confirm that the medium is in the idle state in the DIFS and immediately transmit a frame. In the meantime, the remaining STAs monitor the busy state of the medium, and operate in the standby mode. During operation of STA3, each of STA1, STA2, and STA5 may have data to be transmitted. If the idle state of the medium is monitored, each of STA1, STA2, and STA5 waits for the DIFS time and then performs countdown of the backoff slot according to a random backoff count value which they have selected. In the example shown in FIG. 6, STA2 selects the least backoff count value and STA1 selects the greatest backoff count value. That is, when the STA2 starts data transmission after completing backoff counting, the residual backoff time of STA5 is shorter than the residual backoff time of STA1. Each of STA1 and STA5 temporarily stops countdown and waits while STA2 occupies the medium. When occupancy by the STA2 is terminated and the medium returns to the idle state, each of STA1 and STA5 waits for a predetermined DIFS time, and restarts backoff counting. That is, after the residual backoff slot as long as the residual backoff time is counted down, frame transmission may start. Since the residual backoff time of STA5 is shorter than that of STA1, STA5 starts frame transmission. Meanwhile, STA4 may be given data to be transmitted while STA2 occupies the medium. In this case, when the medium is in the idle state, STA4 may wait for the DIFS time, perform countdown according to the random backoff count value selected by the STA4, and then start frame transmission. FIG. 6 exemplarily illustrates a case in which the residual backoff time of STA5 is equal to the random backoff count value of STA4 by chance. In this case, collision may occur between STA4 and STA5. If collision occurs between STA4 and STA5, none of STA4 and STA5 receives ACK, and accordingly data transmission fails. In this case, each of STA4 and STA5 may double the CW value, select a random backoff count value and then perform countdown. Meanwhile, STA1 waits while the medium is in the busy state due to transmission operation by STA4 and STA5. In this case, when the medium returns to the idle state, STA1 waits for the DIFS time, and then starts frame transmission after lapse of the residual backoff time.

Sensing Operation of STA

As described above, the CSMA/CA mechanism includes not only a physical carrier sensing through which the AP and/or STA directly sense the medium, but also virtual carrier sensing. The virtual carrier sensing is performed to address some problems (such as a hidden node problem) encountered in the medium access. In the virtual carrier sensing, MAC of the WLAN system may use a network allocation vector (NAV). By means of the NAV value, the AP and/or STA which is using the medium or has authority to use the medium indicates, for another AP and/or another STA, the remaining time until the medium becomes available. Accordingly, the NAV value may correspond to a reserved period during which the medium is used by the AP and/or STA to transmit a frame. An STA having received the NAV value may be prohibited from medium access during the corresponding period. For example, NAV may be set according to the value of the Duration field in the MAC header of a frame.

A robust collision detection mechanism has been introduced to reduce the probability of such collision. Hereinafter, this mechanism will be described with reference to FIGS. 7 and 8. The actual carrier sensing range may not be identical to the transmission range, but for simplicity of description, it will be assumed that the actual carrier sensing range is identical to the transmission range.

Figure 7:
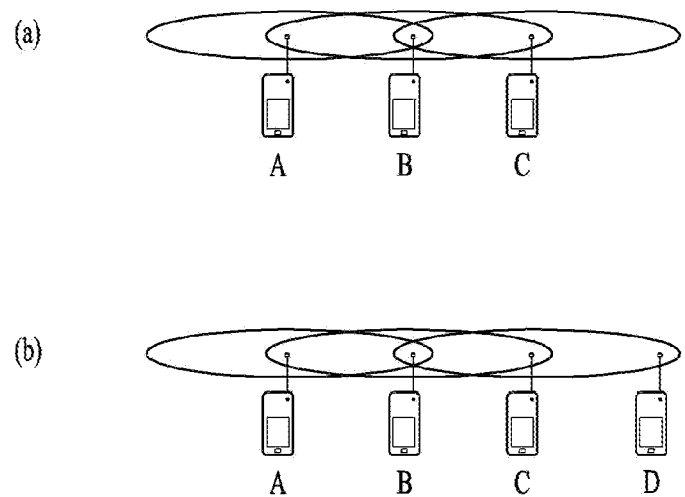
FIG. 7 illustrates a hidden node and an exposed node.

FIG. 7 illustrates a hidden node and an exposed node.

FIG. 7(a) exemplarily shows a hidden node. In FIG. 7(a), STA A communicates with STA B, and STA C has information to be transmitted. Specifically, STA C may determine that the medium is in the idle state in performing carrier sensing prior to transmission of data to STA B, even in a situation in which STA A is transmitting information to STA B. This is because transmission by STA A (i.e., busy medium) may not be sensed at the location of STA C. In this case, collision may occur since STA B receives information of STA A and information of STA C simultaneously. In this case, STA A may be considered a hidden node of STA C.

FIG. 7(b) exemplarily shows an exposed node. In this example, STA C has information to be transmitted to STA D in a situation in which STA B is transmitting data to STA A. In this case, STA C may perform carrier sensing and determine that the medium is busy due to transmission of STA B. Therefore, although STA C has information to be transmitted to STA D, STA C should wait until the medium returns to the idle state since the busy state of the medium is sensed. However, since STA A is actually positioned outside the transmission range of STA C, transmission from STA C may not collide with transmission from STA B in view of STA A, and STA C is unnecessarily waiting until STA B stops transmission. In this case, STA C may be viewed as an exposed node of STA B.

Figure 8:
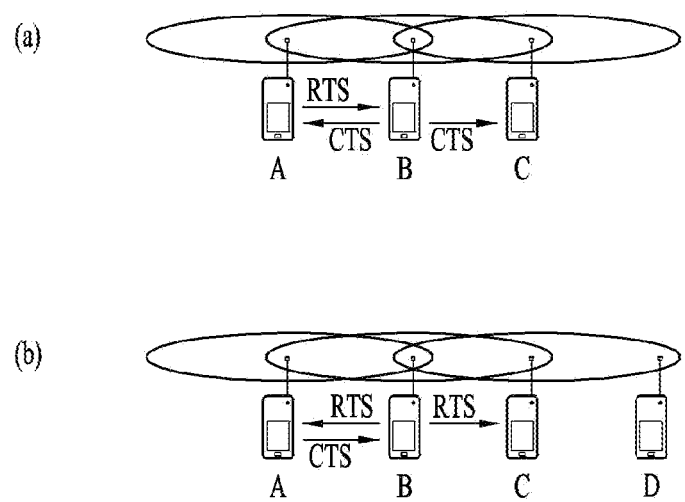
FIG. 8 illustrates RTS and CTS.

FIG. 8 illustrates RTS and CTS.

Figure 13:
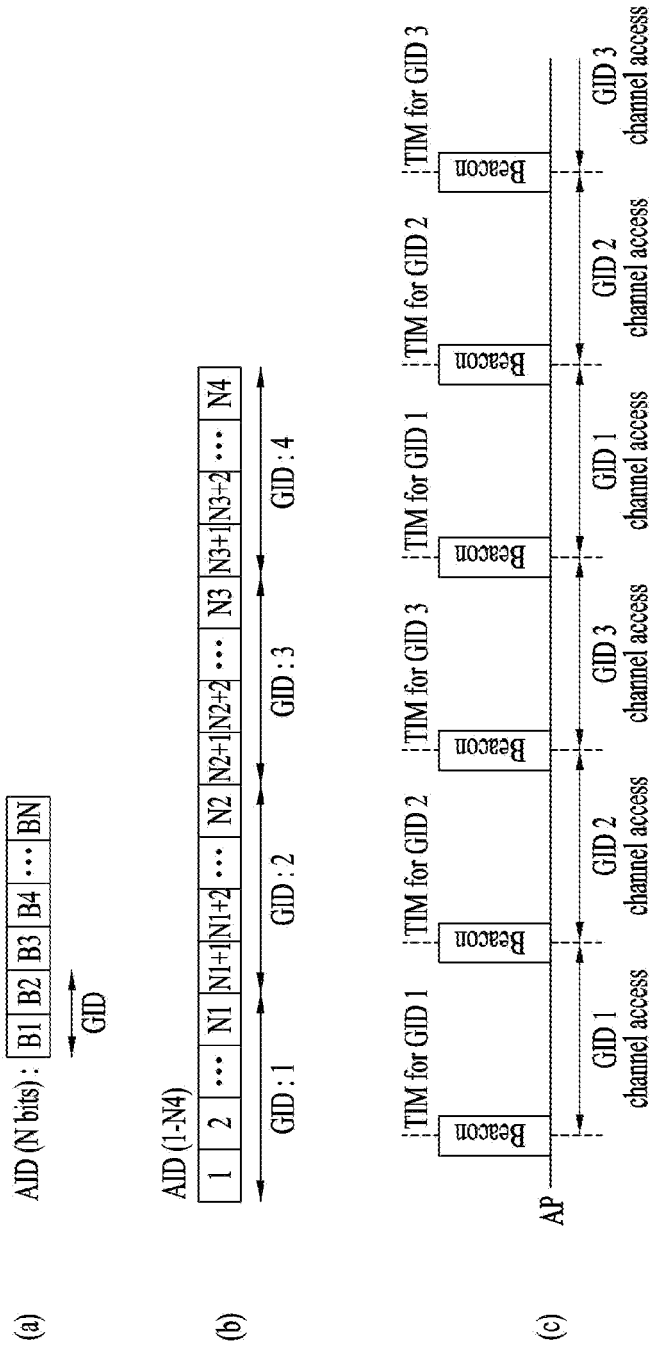
FIG. 13 illustrates a group-based AID.

In order to efficiently utilize the collision avoidance mechanism in an exemplary situation as shown in FIG. 13, short signaling packets such as RTS (request to send) and CTS (clear to send) may be used. RTS/CTS between two STAs may be overheard by nearby STA(s), such that the nearby STA(s) may consider whether information is communicated between the two STAs. For example, if an STA to transmit data transmits an RTS frame to another STA to receive data, the STA to receive data may transmit the CTS frame to nearby STAs, thereby informing the nearby STAs that the STA is about to receive data.

FIG. 8(a) exemplarily shows a method to solve the hidden node problem. The method assumes a situation in which both STA A and STA C attempt to transmit data to STA B. If STA A transmits RTS to STA B, STA B transmits CTS to both STA A and STA C located around STA B. As a result, STA C waits until STA A and STA B stop data transmission, and thus collision is avoided.

FIG. 8(b) exemplarily shows a method to solve the exposed node problem. STA C may overhear RTS/CTS transmission between STA A and STA B, thereby determining that no collision will occur when it transmits data to another STA (e.g., STA D). That is, STA B may transmit RTS to all the nearby STAs, and transmits CTS only to STA A which actually has data to transmit. Since STA C receives only the RTS, but fails to receive the CTS of STA A, STA C may recognize that STA A is located outside the carrier sensing range of STA C.

Power Management

As described above, STAs in the WLAN system should perform channel sensing before they perform transmission/reception operation. Persistently performing channel sensing causes persistent power consumption of the STA. There is not much difference in power consumption between the reception state and the transmission state, and continuous maintenance of the reception state may cause large load to the STAs provided with limited power (i.e., operated by a battery). Therefore, if an STA maintains the reception standby mode so as to persistently sense the channel, power is inefficiently consumed without special advantages in terms of WLAN throughput. To address this problem, the WLAN system supports a power management (PM) mode of the STA.

The PM mode of the STA is classified into an active mode and a power save (PS) mode. The STA is basically operated in the active mode. The STA operating in the active mode maintains an awake state. When the STA is in the awake state, the STA may normally perform frame transmission/reception, channel scanning, or the like. On the other hand, the STA in the PS mode operates by switching between the sleep state (or doze state) and the awake state. The STA in the sleep state operates with minimum power and does not perform either frame transmission/reception or channel scanning.

As the time for which the STA operates in the sleep state increases, the amount of power consumption of the STA is reduced, and accordingly the STA operation period increases. However, since transmission or reception of the frame is not allowed in the sleep state, the STA cannot operate unconditionally in the sleep state for a long time. When the STA operating in the sleep state is given a frame to be transmitted to the AP, it may be switched to the awake state to transmit/receive the frame. On the other hand, when the AP has a frame to transmit to the STA which is in sleep-state, the STA cannot receive the frame. Nor can the STA recognize presence of the frame. Accordingly, in order to recognize presence or absence of a frame to be transmitted to the STA (or in order to receive the frame if the frame is present), the STA may need to be switched to the awake state according to a specific period.

Figure 9:
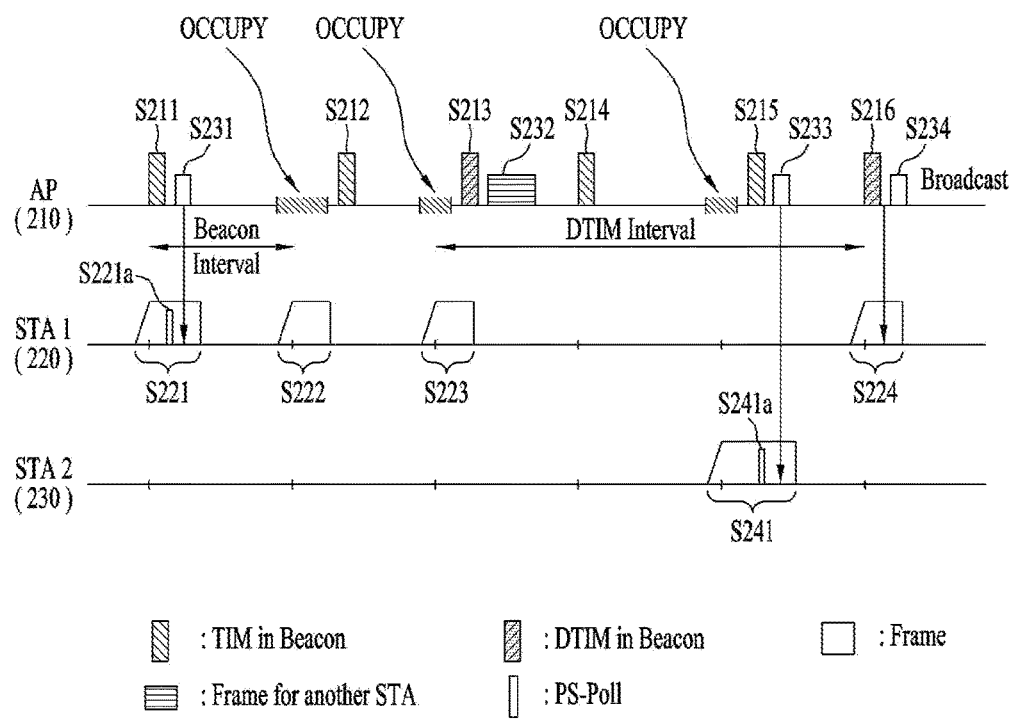
FIG. 9 illustrates a power management operation.

FIG. 9 illustrates a power management operation.

Referring to FIG. 9, AP 210 transmits a beacon frame to STAs present in the BSS at predetermined time intervals (S211, S212, S213, S214, S215 and S216). The beacon frame includes a traffic indication map (TIM) information element. The TIM information element contains information indicating that the AP 210 has buffered traffic for the STAs associated with the AP 210 and that a frame will be transmitted. The TIM element includes a TIM used to inform of a unicast frame and a delivery traffic indication map (DTIM) used to inform of a multicast or broadcast frame.

AP 210 may transmit a DTIM once per three transmissions of the beacon frame. STA1 220 and STA2 222 are operating in the PS mode. Each of STA1 220 and STA2 222 may be set to be switched from the sleep state to the awake state at every wakeup interval of a predetermined period to receive the TIM element transmitted by the AP 210. Each STA may calculate a switching time to switch to the awake state, based on its own local clock. In the example shown in FIG. 9, it is assumed that the clock of the STA coincides with that of the AP.

For example, the predetermined wakeup interval may be set in such a manner that STA1 220 can switch to the awake state at every beacon interval to receive the TIM element. Accordingly, when AP 210 transmits the beacon frame for the first time (S211), STA1 220 may switch to the awake state (S221). Thereby, STA1 220 may receive the beacon frame and acquire the TIM element. If the acquired TIM element indicates that there is a frame to be transmitted to STA1 220, STA1 220 may transmit a power save-Poll (PS-Poll) frame, which requests transmission of the frame, to the AP 210 (S221a). In response to the PS-Poll frame, the AP 210 may transmit the frame to STA 1 220 (S231). After completing reception of the frame, STA1 220 is switched back to the sleep state to operate in the sleep state.

When the AP 210 transmits the beacon frame for the second time, the medium is in the busy state in which the medium is accessed by another device, and accordingly the AP 210 may not transmit the beacon frame at the correct beacon interval, but may transmit the beacon frame at a delayed time (S212). In this case, STA1 220 is switched to the awake state in accordance with the beacon interval, but does not receive the beacon frame whose transmission is delayed, and is thus switched back to the sleep state (S222).

When the AP 210 thirdly transmits the beacon frame, the beacon frame may include a TIM element set to a DTIM. However, since the medium is in the busy state, the AP 210 transmits the beacon frame at a delayed time (S213). STA1 220 is switched to the awake state in accordance with the beacon interval, and may acquire the DTIM through the beacon frame transmitted by the AP 210. It is assumed that the DTIM acquired by STA1 220 indicates that there is no frame to be transmitted to STA1 220, but there is a frame for another STA. In this case, STA1 220 may confirm that there is no frame to receive and be switched back to the sleep state to operate in the sleep state. After transmission of the beacon frame, the AP 210 transmits the frame to the corresponding STA (S232).

The AP 210 fourthly transmits the beacon frame (S214). STA1 220 may adjust the wakeup interval for reception of the TIM element since it did not acquire information indicating presence of buffered traffic for STA1 220 through the two previous operations of reception of the TIM element. Alternatively, provided that signaling information for adjustment of the value of the wakeup interval of STA1 220 is contained in the beacon frame transmitted by the AP 210, the wakeup interval value of the STA1 220 may be adjusted. In this example, STA1 220 may be set to be switched to the awake state once at every three beacon intervals to receive a TIM element rather than being set to be switched between the operating states at every beacon interval. Therefore, when the AP 210 fifthly transmits the beacon frame (S215) after the fourth transmission of the beacon frame (S214), STA1 220 maintains the sleep state, and thus cannot acquire the corresponding TIM element.

When AP 210 sixthly transmits the beacon frame (S216), STA1 220 may be switched to the awake state and acquire the TIM element contained in the beacon frame (S224). Since the TIM element is a DTIM indicating presence of a broadcast frame, STA1 220 may receive the broadcast frame transmitted by the AP 210 without transmitting a PS-Poll frame to the AP 210 (S234). In the meantime, the wakeup interval set by STA2 230 may have a greater length than the wakeup interval of STA1 220. Accordingly, STA2 230 is switched to the awake state at a time point (S215) when the AP 210 fifthly transmits the beacon frame, such that the STA2 230 may receive the TIM element (S241). STA2 230 may recognize presence of a frame to be transmitted thereto through the TIM element and transmit the PS-Poll frame to the AP 210 in order to request frame transmission (S241a). The AP 210 may transmit the frame to STA2 230 in response to the PS-Poll frame (S233).

In order to operate/manage the PS mode as shown in FIG. 9, the TIM element includes a TIM indicating presence or absence of a frame to be transmitted to the STA or a DTIM indicating presence or absence of a broadcast/multicast frame. The DTIM may be implemented through field setting for the TIM element.

Figure 10:
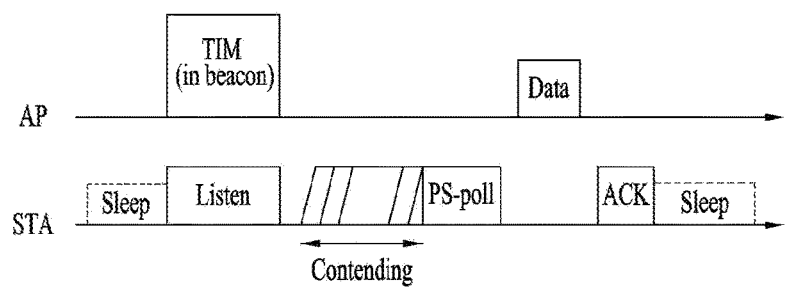
FIGS. 10 to 12 illustrate operations of a station (STA) having received a TIM in detail.
Figure 11:
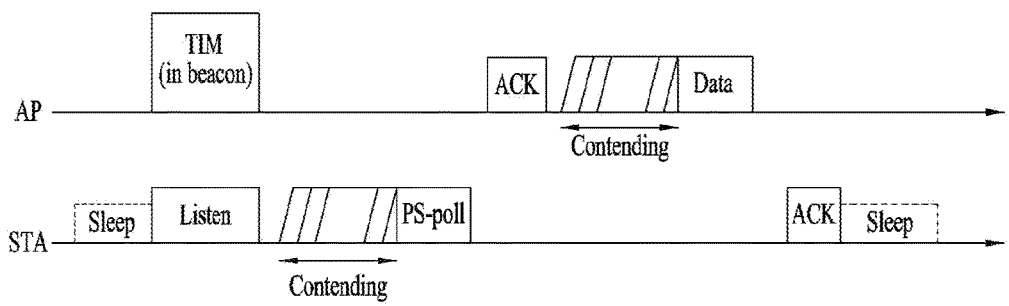
Figure 12:
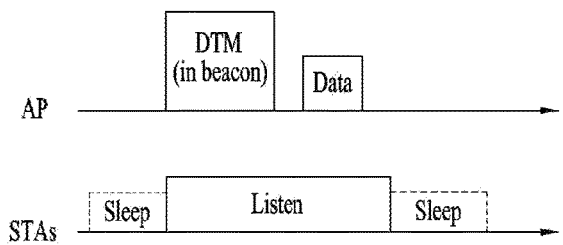

FIGS. 10 to 12 illustrate operations of an STA having received a TIM in detail.

Referring to FIG. 10, an STA is switched from the sleep state to the awake state to receive the beacon frame including a TIM from the AP. The STA interprets the received TIM element such that it can recognize presence of buffered traffic to be transmitted thereto. After the STA contends with other STAs to access the medium for PS-Poll frame transmission, the STA may transmit a PS-Poll frame to the AP to request data frame transmission. The AP, upon receiving the PS-Poll frame transmitted from the STA, may transmit the frame to the STA. The STA may receive the data frame and transmit an ACK frame to the AP in response to the received data frame. Thereafter, the STA may be switched back to the sleep state.

As shown in FIG. 10, the AP may operate in a manner of immediate response in which the AP transmits the data frame when a predetermined time (e.g., a short inter-frame space (SIFS)) elapses after the AP receives the PS-Poll frame from the STA. However, the AP may operate in a manner of deferred response if the AP fails to prepare a data frame to be transmitted to the STA for the SIFS time after receiving the PS-Poll frame, which will be described in detail with reference to FIG. 11.

In the example of FIG. 11, the operations of the STA of switching from the sleep state to the awake state, receiving a TIM from the AP, and transmitting the PS-Poll frame to the AP through contention are identical to those in the example of FIG. 10. If the AP having received the PS-Poll frame fails to prepare a data frame for the SIFS time, the AP may transmit an ACK frame to the STA instead of transmitting the data frame. If the data frame is prepared after transmission of the ACK frame, the AP may perform contention and transmit the data frame to the STA. The STA may transmit the ACK frame indicating successful reception of the data frame to the AP, and then be switched to the sleep state.

FIG. 12 shows an exemplary case in which AP transmits DTIM. STAs may be switched from the sleep state to the awake state so as to receive the beacon frame including a DTIM element from the AP. The STAs may recognize, through the received DTIM, that a multicast/broadcast frame will be transmitted. After transmitting the beacon frame including the DTIM, the AP may immediately transmit data (i.e., a multicast/broadcast frame) without transmitting/receiving the PS-Poll frame. While the STAs continue to maintain the awake state even after receiving the beacon frame including the DTIM, the STAs may receive data and then switch back to the sleep state after data reception is completed.

TIM Structure

In the operation and management method of the power save (PS) mode based on the TIM (or DTIM) protocol described above with reference to FIGS. 9 to 12, STAs may determine presence or absence of a data frame to be transmitted therefor through STA identification information contained in the TIM element. STA identification information may be specific information associated with an association identifier (AID) to be allocated when an STA is associated with an AP.

The AID is used as a unique ID of each STA within a BSS. For example, in the current WLAN system, an AID may be assigned a value between 1 and 2007. In the currently defined WLAN system, 14 bits for the AID may be allocated to a frame transmitted by an AP and/or an STA. Although the AID may be assigned any value up to 16383, the values from 2008 to 16383 are set as reserved values.

The TIM element according to legacy definition is inappropriate for M2M application in which a large number of STAs (e.g., at least 2007 STAs) are associated with one AP.

If the conventional TIM structure is extended without any change, the TIM bitmap size may excessively increase. Accordingly, it may be impossible to support the extended TIM structure using the legacy frame format, and the extended TIM structure is inappropriate for M2M communication in which application of a low transfer rate is considered. In addition, it is expected that the number of STAs having a reception data frame during one beacon period is very small. Therefore, in view of the aforementioned exemplary application of M2M communication, it is expected that a TIM bitmap has a large size with most bits set to zero (0) in many cases. Therefore, there is a need for a technology capable of efficiently compressing a bitmap.

In the legacy bitmap compression technology, a series of 0s is omitted from the front part of a bitmap to define an offset (or start point) value. However, compression efficiency is not high in the case in which the number of STAs including a buffered frame is small, but there is a high difference between AID values of the STAs. For example, in the case in which a frame to be transmitted only to STAs whose AIDs are set to 10 and 2000 is buffered, the length of the compressed bitmap is 1990, but all the parts of the bit map other than both end parts are set to zero (0). If the number of STAs associated with one AP is small, inefficiency of bitmap compression may not be a serious problem. However, if the number of STAs associated with one AP increases, such inefficiency may deteriorate overall system performance.

In order to address this issue, AIDs may be divided into a plurality of groups such that data can be more efficiently transmitted with the AIDs. A designated group ID (GID) is allocated to each group. Hereinafter, AIDs allocated on the group basis will be described with reference to FIG. 13.

FIG. 13(a) is a diagram illustrating an exemplary AID allocated on the group basis. In FIG. 13(a), some bits located at the front part of the AID bitmap may be used to indicate a group ID (GID). For example, the first two bits of an AID bitmap may be used to designate four GIDs. If the total length of the AID bitmap is N bits, the first two bits (B1 and B2) may represent a GID of a corresponding AID.

FIG. 13(b) is a diagram illustrating another exemplary AID allocated on the group basis. In FIG. 13(b), a GID may be allocated according to the position of an AID. In this case, AIDs having the same GID may be represented by an offset and a length value. For example, if GID 1 is denoted by an offset of A and a length of B, this means that AIDs A to A+B−1 on a bitmap are set to GID 1. For example, FIG. 13(b) assumes that AIDs 1 to N4 are divided into four groups. In this case, AIDs belonging to GID 1 are denoted by 1 to N1, and may be represented by an offset of 1 and a length of N1. AIDs belonging to GID 2 may be represented by an offset of N1+1 and a length of N2−N1+1, AIDs belonging to GID 3 may be represented by an offset of N2+1 and a length of N3−N2+1, and AIDs belonging to GID 4 may be represented by an offset of N3+1 and a length of N4−N3+1.

If AIDs allocated on the group basis are introduced, channel access may be allowed in different time intervals according to GIDs. Thereby, the problem of lack of TIM elements for a large number of STAs may be solved and at the same time data transmission/reception may be efficiently performed. For example, in a specific time interval, channel access is allowed only for STA(s) corresponding to a specific group, and channel access of the remaining STA(s) may be restricted. A predetermined time interval in which only specific STA(s) is allowed to perform channel access may be referred to as a restricted access window (RAW).

Hereinafter, channel access based on GIDs will be described with reference to FIG. 13(c). FIG. 13(c) illustrates an exemplary channel access mechanism according to beacon intervals with AIDs divided into three groups. A first beacon interval (or a first RAW) is an interval in which channel access of an STA corresponding to an AID belonging to GID 1 is allowed, and channel access of STAs belonging to the other GIDs is not allowed. To implement this mechanism, a TIM element used only for AIDs corresponding to GID 1 is contained in a first beacon frame. A TIM element used only for AIDs corresponding to GID 2 is contained in a second beacon frame. Accordingly, channel access is allowed only for an STA corresponding to the AIDs belonging to GID 2 in a second beacon interval (or a second RAW). A TIM element used only for AIDs corresponding to GID 3 is contained in a third beacon frame. Accordingly, channel access is allowed only for an STA corresponding to the AIDs belonging GID 3 in a third beacon interval (or a third RAW). A TIM element used only for AIDs corresponding GID 1 is contained in a fourth beacon frame. Accordingly, channel access is allowed only for an STA corresponding to the AIDs belonging to GID 1 in a fourth beacon interval (or a fourth RAW). Thereafter, only channel access of an STA corresponding to a specific group indicated by the TIM contained in a corresponding beacon frame may be allowed in each of beacon intervals subsequent to the fifth beacon interval (or in each of RAWs subsequent to the fifth RAW).

While FIG. 13(c) exemplarily shows a case in which the order of allowed GIDs is periodical or cyclical according to the beacon intervals, embodiments of the present invention are not limited thereto. That is, only AID(s) belonging to specific GID(s) may be contained in a TIM element, such that only channel access of STA(s) corresponding to the specific AID(s) is allowed in a specific time interval (for example, a specific RAW), and channel access of the other STA(s) is not allowed.

The aforementioned group-based AID allocation scheme may also be referred to as a hierarchical structure of a TIM. That is, the entirety of an AID space may be divided into a plurality of blocks, and only STA(s) (i.e., STA(s) of a specific group) corresponding to a specific block having a value other than '0' may be allowed to perform channel access. Thereby, a large-sized TIM is divided into small-sized blocks/groups, an STA can easily maintain TIM information, and blocks/groups may be easily managed according to a class, QoS or usage of the STA. While FIG. 13 exemplarily shows a 2-level hierarchy, a hierarchical TIM structure comprised of two or more levels may be configured. For example, the whole AID space may be divided into a plurality of page groups, each page group may be divided into a plurality of blocks, and each block may be divided into a plurality of sub-blocks. In this case, an extended version of the example of FIG. 13(a) may be configured such that first N1 bits in an AID bitmap represent a page ID (PID), the next N2 bits represent a block ID, the next N3 bits represent a sub-block ID, and the remaining bits represent the position of STA bits within a sub-block.

In examples of the present invention described below, various methods to divide STAs (or AIDs allocated to the respective STAs) into predetermined hierarchical groups and many the same are applicable. However, the group-based AID allocation scheme is not limited to the above examples.

Frame Structure

Figure 14:
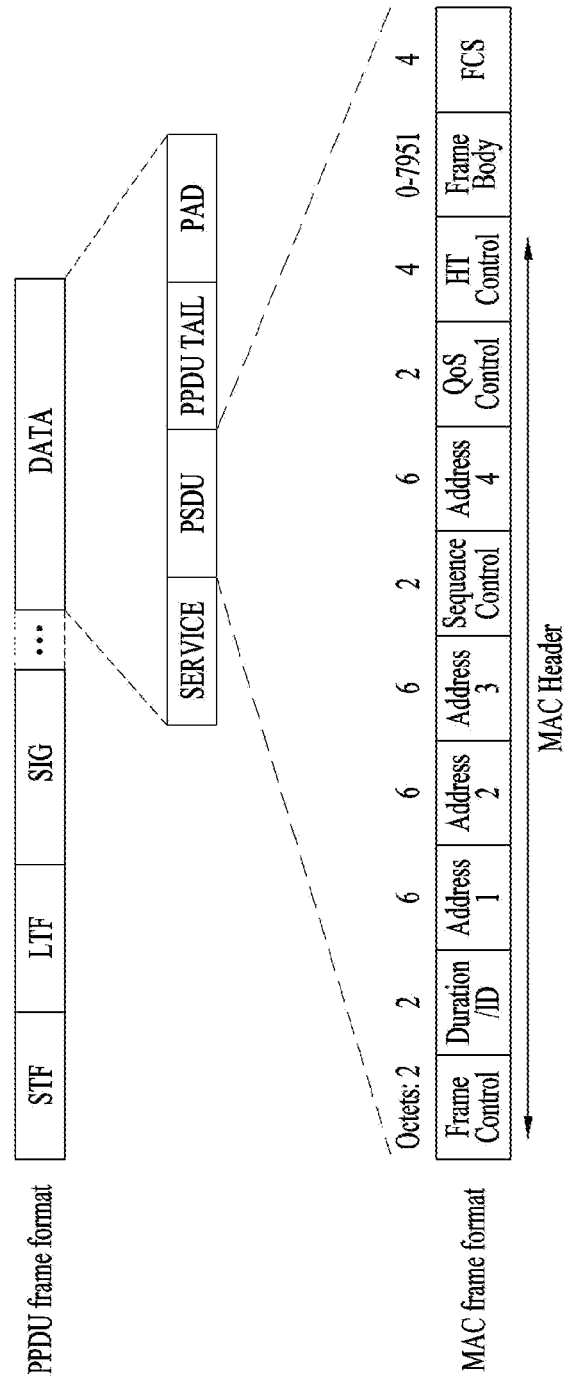
FIG. 14 is a diagram illustrating an exemplary frame structure used in the IEEE 802.11 system.

FIG. 14 is a diagram illustrating an exemplary frame structure used in the IEEE 802.11 system.

A PPDU (Physical Layer Convergence Protocol (PLCP) Packet Data Unit) frame format may include a STF (Short Training Field), an LTF (Long Training Field), an SIG (SIGNAL) field, and a data field. The most basic PPDU frame format (e.g., a non-HT (High Throughput) PPDU frame format) may consist of an L-STF (Legacy-STF), an L-LTF (Legacy-LTF), an SIG field, and a Data field. In addition, depending on the type of a PPDU frame format (e.g., an HT-mixed format PPDU, an HT-greenfield format PPDU, a VHT (Very High Throughput) PPDU, etc.), additional (or another type) STF, LTF, and SIG field may be included between the SIG field and the Data field.

The STF is a signal for signal detection, automatic gain control (AGC), diversity selection, precise time synchronization, and the like, and the LTF is a signal for channel estimation, frequency error estimation, and the like. A combination of the STF and the LTF may be referred to as a PLCP preamble. The PLCP preamble may be viewed as a signal for channel estimation and synchronization of an OFDM physical layer.

The SIG field may include a RATE field and a LENGTH field. The RATE field may contain information about data demodulation and coding rate. The LENGTH field may contain information about the length of data. Additionally, the SIG field may include a parity bit and an SIG TAIL bit.

The Data field may include a SERVICE field, a PSDU (PLCP Service Data Unit), a PPDU TAIL bit. When necessary, the Data field may also include a padding bit. Some bits of the SERVICE field may be used to synchronize a descrambler of a receiver. The PSDU corresponds to a MAC protocol data unit (PDU) defined in the MAC layer, and may contain data produced/used in a higher layer. The PPDU TAIL bit may be used to return the state of an encoder set to 0. The padding bit may be used to adjust the length of the data field in a predetermined unit.

The MAC header includes a Frame Control field, a Duration/ID field and Address fields. The Frame Control field may contain control information necessary for frame transmission/reception. The Duration/ID field may be set to a time for transmission of a course on the frame. For details of Sequence Control, QoS Control and HT Control subfields of the MAC header, the IEEE 802.11-2012 standard document may be referenced.

The Frame Control field of the MAC header may include Protocol Version, Type, Subtype, To DS, From DS, More Fragment, Retry, Power Management, More Data, Protected Frame and Order subfields. For details of the subfields, the IEEE 802.11-2012 standard document may be reference to.

Meanwhile, the null-data packet (NDP) frame format refers to a frame format that does not contain a data packet. That is, the NDP frame generally refers to a frame format that includes only the PLCP header portion (i.e., STF, LTF and SIG fields) of the typical PPDU format, and does not include the other portion of the PPDU format (i.e., the Data field). The NDP frame may be referred to as a short frame format.

S1G Frame Format

In order to support applications such as M2M, IoT (Internet of Things) and smart grid, long-range and low-power communication is required. To this end, use of a communication protocol adopting 1 MHz/2 MHz/4 MHz/8 MHz/16 MHz channel bandwidths in a frequency band (e.g., 902-928 MHz) less or equal to 1 GHz (Sub 1 GHz; S1G) is under discussion.

As S1G PPDU formats, 3 types of formats are defined: a short format used in the bandwidth less than or equal to the S1G 2 MHz bandwidth, a long format used in a bandwidth greater than or equal to the S1G 2 MHz bandwidth, and a format used in the S1G 1 MHz bandwidth.

Figure 15:
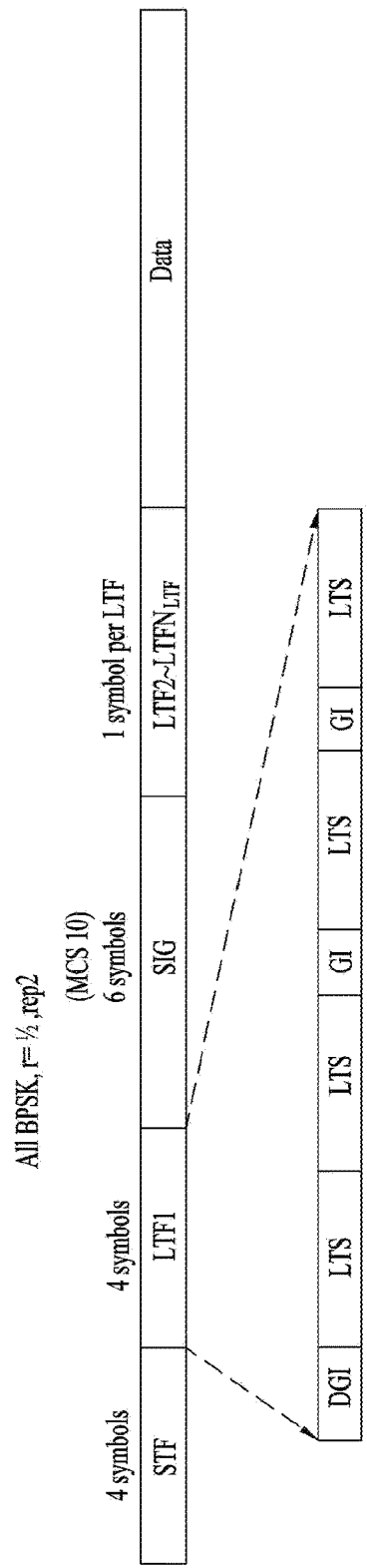
FIG. 15 is a diagram illustrating an example of S1G 1 MHz format.

FIG. 15 is a diagram illustrating an example of an S1G 1 MHz format.

The S1G 1 MHz format may be used for transmission of 1 MHz PPDU Single User (SU).

The S1G 1 MHz format of FIG. 15, which is similar to the Green-field format defined in IEEE 802.11n, consists of STF, LTF1, SIG, LTF2-LTFN, and Data fields. The transmission time of the preamble portion of the S1G 1 MHz format is increased by more than twice the transmission time of the Green-field format through repetition of transmission.

The STF field of FIG. 15 has the same periodicity as the STF (of the 2-symbol length) of the PPDU for a bandwidth greater than or equal to 2 MHz, but has a 4-symbol length (e.g., 160 µs) by applying twice repetition (rep2) over time and may be subjected to 3 dB power boosting.

The LTF1 field of FIG. 15 may be designed to be orthogonal to the LTF1 field (of 2-symbol length) of the PPDU for the bandwidth greater than or equal to 2 MHz in the frequency domain, and have a 4-symbol length through repetition thereof over time. The LTF1 field may include DGI (Double Guard Interval), LTS (Long Training Sequence), LTS, GI (Guard Interval), LTS, GI, and LTS.

The SIG field of FIG. 15 may be repeatedly coded. The lowest Modulation and Coding Scheme (MCS) (i.e. BPSK (Binary Phase Shift Keying)) and repetitive coding (rep2) may be applied to the SIG field. The SIG field may be configured such that the rate becomes ½ and the length of the SIG field may be defined as a 6-symbol length.

The fields of FIG. 15 from the LTF2 field to the LTFNLTF field may be included in the case of MIMO. Each of the LTF fields may have a 1-symbol length.

Figure 16:
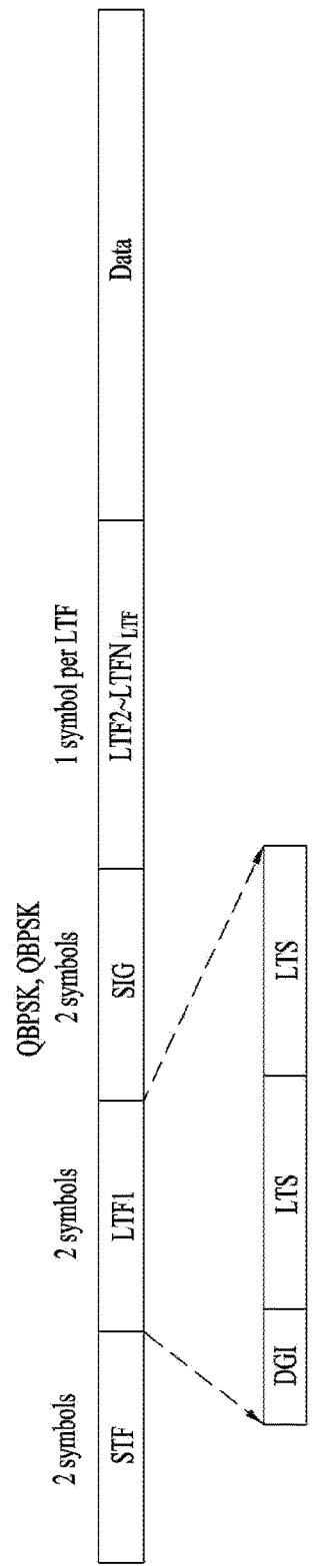
FIG. 16 is a diagram illustrating an exemplary format which is shortened by a value greater than or equal to S1G 2 MHz.

FIG. 16 is a diagram illustrating an exemplary format which is shortened by a value greater than or equal to S1G 2 MHz.

The S1G greater than or equal to 2 MHz short format may be used for SU transmission which employs 2 MHz, 4 MHz, 8 MHz and 16 MHz PPDUs.

The STF field of FIG. 16 may have a 2-symbol length.

The LTF1 field of FIG. 16 may have a 2-symbol length, and include DGI, LTS and LTS.

QPSK (Quadrature PSK), BPSK or the like may be applied to the SIG field of FIG. 16 as an MCS, and the SIG field of FIG. 16 has a length of two symbols.

Each of the fields of FIG. 16 from the LTF2 field to the LTFNLTF field may have a 1-symbol length.

Figure 17:
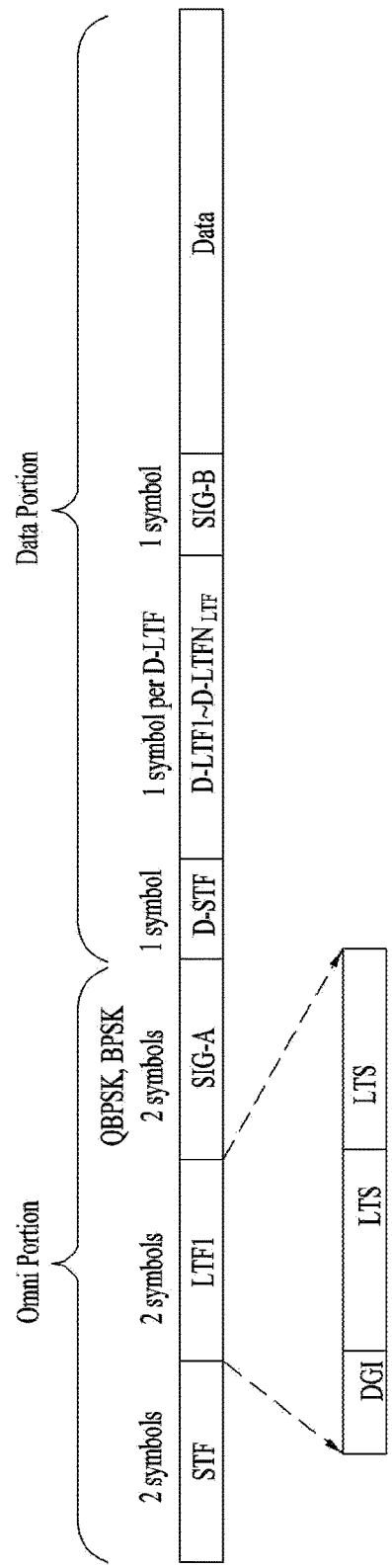
FIG. 17 is a diagram illustrating an exemplary format which is lengthened by a value greater than or equal to S1G 2 MHz.

FIG. 17 is a diagram illustrating an exemplary format which is lengthened by a value greater than or equal to S1G 2 MHz.

The 'S1G greater than or equal to 2 MHz long' format may be used for SU beamformed transmission and MU transmission employing 2 MHz, 4 MHz, 8 MHz and 16 MHz PPDUs. The 'S1G greater than or equal to 2 MHz long' format may include an Omni portion which is transmitted in all directions and a data portion to which beamforming is applied.

The STF field of FIG. 17 may have a 2-symbol length.

The LTF1 field of FIG. 17 may have a 2-symbol length, and include DGI, LTS, and LTS.

The SIG-A (SIGNAL-A) field of FIG. 17 may be subjected to QPSK, BPSK or the like as an MCS and have a 2-symbol length.

The D-STF (Short Training field for Data) field of FIG. 17 may have a 1-symbol length.

Each of the D-LTF (Long Training field for Data) fields of FIG. 17, namely the fields from the D-LTF1 field to the D-LTFNLTF field may have a 1-symbol length.

The SIG-B (SIGNAL-B) field of FIG. 17 may have a 1-symbol length.

Channel Access Mechanism in BSS Supporting 1 MHz Channel Bandwidth and Channel Bandwidth Greater than or Equal to 2 MHz The present invention proposes a channel access mechanism in a BSS supporting 1 MHz channel bandwidth and a channel bandwidth greater than or equal to 2 MHz, specifically a backoff mechanism.

STAs belonging to the BSS performs the backoff mechanism using a primary channel. That is, the STAs may perform CCA on the primary channel to determine whether or not the corresponding channel (or medium) is idle. The primary channel may be defined as a channel common to all STAs which are constituents of the BSS, and may be used for transmission of a basic signal such as a beacon. In addition, the primary channel may be a channel basically used for transmission of a data unit (e.g., PPDU). When the width of a channel used for the STA to perform data transmission is greater than that of the primary channel, the remaining portion of the channel except the primary channel is referred to as a secondary channel.

In the conventional WLAN system, only one size of bandwidth of the primary channel is defined. In the advanced WLAN system, on the other hand, the primary channel may have two different channel bandwidths according to the capability of the STA. The present invention proposes a backoff mechanism in a multi-channel environment.

For example, a sensor type STA may support (only) the 1 MHz or 2 MHz channel bandwidth to lower implementation complexity. However, for IoT type STAs and M2M type STAs, higher throughput is required. To support the higher throughput, the IoT type STAs and M2M type STAs may support (only) the 2 MHz, 4 MH, 8 MHz or 16 MHz channel bandwidth.

In the present invention, STAs supporting the 1 MHz or 2 MHz channel bandwidth will be referred to as low rate (LR) STAs, and STAs supporting the 2 MHz, 4 MH, 8 MHz or 16 MHz channel bandwidth will be referred to as a high rate (HR) STAs. It is assumed that the primary channel of the LR STA has the 1 MHz channel bandwidth, and the primary channel of the HR STA has the 2 MHz channel bandwidth.

Hereinafter, a specific description will be given of a backoff mechanism of STAs in a multi-channel environment where the primary channel has two different channel boundaries according to capabilities of STAs as described above.

An AP may designate, through a beacon frame, a primary channel for the LR STA to use. This channel will be referred to as a first primary channel. In addition, the AP may designate a primary channel for the HR STA to use. The channel will be referred to as a second primary channel. For example, the first channel may correspond to a primary channel having the 1 MHz bandwidth, and the second primary channel may correspond to a primary channel having the 2 MHz bandwidth.

Figure 18:
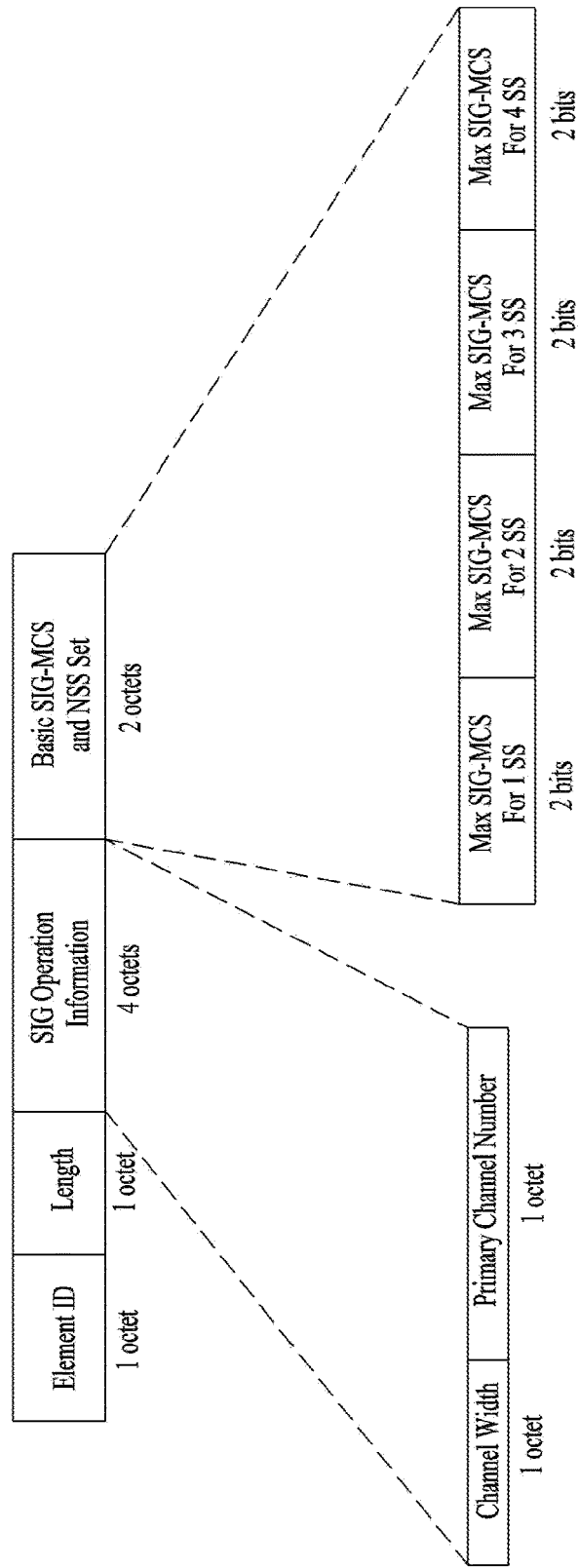
FIG. 18 is a diagram illustrating an exemplary format of an S1G operation element.

FIG. 18 is a diagram illustrating an exemplary format of an S1G operation element.

The S1G operation element of FIG. 18 may be delivered to STAs blowing to the BSS through a beacon frame or a probe response frame. Thereby, a channel set of S1G BSS may be established.

The S1G operation element format may include an Element ID field, a Length field, an S1G Operation Information field, and a Basic S1G-MCS and NSS (Number of Spatial Stream) Set field.

The Element ID field of the S1G operation element may be set to a value indicating that an information element is an S1G operation element.

The Length field of the S1G operation element may be set to a value indicating the length of the subsequent fields.

The S1G Operation Information field of the S1G operation element may include a Channel Width field and a Primary Channel Number field.

For example, bit 0 to bit 5 (B0-B5) of the Channel Width field may be set to a value indicating one of 1, 2, 4, 8 and 16 MHz. Next, bit 6 and bit 7 (B6-B7) of the Channel Width field may be set to a value indicating the location of the first primary channel. For example, 00 may indicate that there is no the first primary channel. 01 may indicate the lower side on the second primary channel, and 10 may indicate the upper side on the second primary channel. The value of 11 may be reserved.

Alternatively, B0-B5 of the Channel Width field may be configured as follows. B0 may be set to 1 if the S1G BSS allows 1 MHz PPDU transmission. B1 may be set to 1 if the S1G BSS allows 2 MHz PPDU transmission. B2 may be set to 1 if the S1G BSS allows 4 MHz PPDU transmission. B3 may be set to 1 if the S1G BSS allows 8 MHz PPDU transmission. B4 may be set to 1 if the S1G BSS allows 16 MHz PPDU transmission. B5 may indicate the location of the 1 MHz primary channel (e.g., B5 set to 0 indicates the lower side on the 2 MHz primary channel, and B5 set to 1 indicates the upper side on the 2 MHz primary channel).

Herein, the first primary channel corresponds to a part of the second primary channel. That is, the first primary channel is present on the second primary channel. In addition, the channel bandwidth of the first primary channel is narrower than that of the second primary channel. For example, the second primary channel (or primary 2 MHz channel) may include the first primary channel (or primary 1 MHz channel), and the first primary channel may be located within 1 MHz on either the higher frequency side or the lower frequency side on the 2 MHz bandwidth of the second primary channel.

The Primary Channel Number field may be set to a value indicating the channel number of the second primary channel.

As described above, the locations of the second primary channel and the first primary channel (if they exist) in the frequency domain may be specified by the Channel Width field and the Primary Channel Number field in the S1G Operation Information field.

The Basic S1G-MCS and NSS Set field of the S1G operation element may include a Max S1G-MCS for 1 SS field, a Max S1G-MCS for 2 SS field, a Max S1G-MCS for 3SS field, and a Max S1G-MCS for 4SS field. The Max S1G-MCS for N (N=1, 2, 3, or 4) SS field may be set to a value indicating an index for an MCS supported to the maximum for N spatial streams (SS).

The AP may support the following three types of BSSs using the S1G operation element described above with reference to FIG. 18.

First, a BSS consisting of LR STAs may be supported. In this case, bits B6 and B7 of the Channel Width field in the S1G operation element of FIG. 18 may be limited to one of 01 or 10. That is, the location of the first primary channel for the LR STAs to use needs to be set to either the lower side or the upper side of the second primary channel to specify the location of the first primary channel.

Second, a BSS consisting of HR STAs may be supported. In this case, bits B6 and B7 of the Channel Width field in the S1G operation element of FIG. 18 may be limited to 00. This means that the first primary channel for the LR STAs is not configured (or present), and 1 MHz PPDU transmission is not supported in the BSS.

Third, a BSS including LR STAs and an HR STA may be supported. In this case, bits B6 and B7 of the Channel Width field in the S1G operation element of FIG. 18 may be set to 00, 01 or 11.

Hereinafter, description will be given of a backoff process of STAs belonging to the BSS when the bandwidth of a primary channel is set to 1 MHz and/or 2 MHz in the BSS.

Basically, when the backoff count value (or backoff timer) reaches 0 through a backoff process on the primary channel, the STA may check whether the secondary channel is idle/busy at the corresponding time and determine the transmission bandwidth.

For example, if the first primary channel is not configured as in the case of a BSS consisting of HR STAs, the STA may invoke the backoff process on the second primary channel (or primary 2 MHz channel). If the second primary channel is idle in the backoff slot, the STA may decrease the backoff timer by 1 at a time, and when the backoff timer reaches 0, the STA may check if the secondary channels are in the idle state. That is, after the backoff timer reaches 0, the STA may perform CCA for the secondary 2 MHz channel, secondary 4 MHz channel or secondary 8 MHz channel. The STA may perform PPDU (e.g., 2, 4, 8, or 16 MHz PPDU) transmission involving the idle secondary channel(s) according to the result of CCA for the secondary channel(s).

For example, if the first primary channel is configured as in the case of a BSS consisting of LR STAs, the STA may invoke the backoff process on the first primary channel (or primary 1 MHz channel). If the first primary channel is idle in the backoff slot, the STA may decrease the backoff timer by 1 at a time, and when the backoff timer reaches 0, the STA may check if the secondary channels are in the idle state. That is, after the backoff timer reaches 0, the STA may perform CCA for the secondary 1 MHz channel, secondary 2 MHz channel, secondary 4 MHz channel or secondary 8 MHz channel. The STA may perform PPDU (e.g., 2, 4, 8, or 16 MHz PPDU) transmission involving the idle secondary channel(s) according to the result of CCA for the secondary channel(s).

Hereinafter, description of the secondary channels will be given in more detail.

The AP may designate, through, for example, a beacon frame, a secondary channel for an LR STA to use. This secondary channel will be referred to as a first secondary channel. In addition, the AP may designate a secondary channel for an HR STA to use. This secondary channel will be referred to as a second secondary channel.

The first secondary channel corresponds to a part of the second primary channel. There may be a plurality of second secondary channels, which may have different channel bandwidths.

Figure 19:
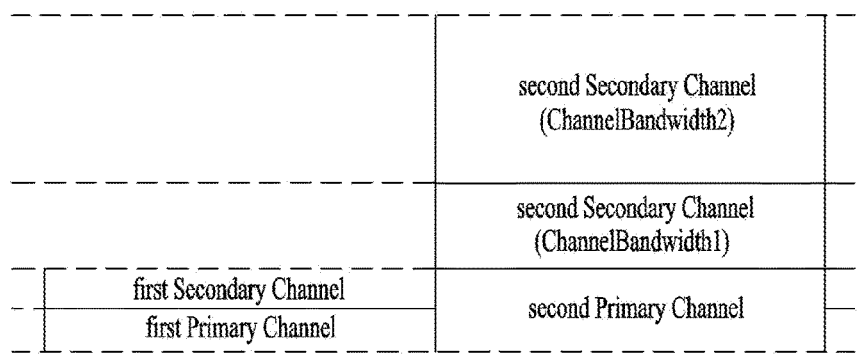
FIG. 19 illustrates a relationship between a primary channel and a secondary channel.

FIG. 19 illustrates a relationship between a primary channel and a secondary channel.

The first primary channel and the first secondary channel correspond to parts of the second primary channel. Only one second secondary channel may be configured or a plurality of second secondary channels may be configured. If a plurality of second secondary channels is configured, the second secondary channels may have different channel bandwidths (e.g., ChannelBandwidth1 and ChannelBandwidth2).

If a channel obtained by bonding the first primary channel and the first secondary channel correspond to the second primary channel, the AP may signal only the first primary channel number, second primary channel number, and second secondary channel number to the STAs, omitting the first secondary channel number.

Hereinafter, description will be exemplarily given of the backoff process performed when the primary channel and the secondary channel are configured as shown in FIG. 19.

An LR STA may perform channel access on the first primary channel. For example, the LR STA may determine whether the first primary channel is idle/busy and invoke the backoff mechanism according to the determination. If the first primary channel remains idle in the backoff slot, the STA decreases the backoff timer by 1. Otherwise, the STA freezes the backoff timer (i.e., the STA maintains the previous backoff counter value without decreasing the value).

An HR STA may perform channel access on the second primary channel. For example, the HR STA may determine, on the secondary channel, if the second primary channel is idle/busy, and invoke the backoff mechanism according to the determination. If the second primary channel remains idle in the backoff slot, the STA decreases the backoff timer by 1. Otherwise, the STA freezes the backoff timer (i.e., the STA maintains the previous backoff count value rather than decreasing the value).

In the case that the STA performs channel sensing on the second primary channel, channel use of another STA is sensed on any of the first primary channel and the first secondary channel which belong to the second primary channel, it must be determined that the second primary channel is busy.

Figure 20:
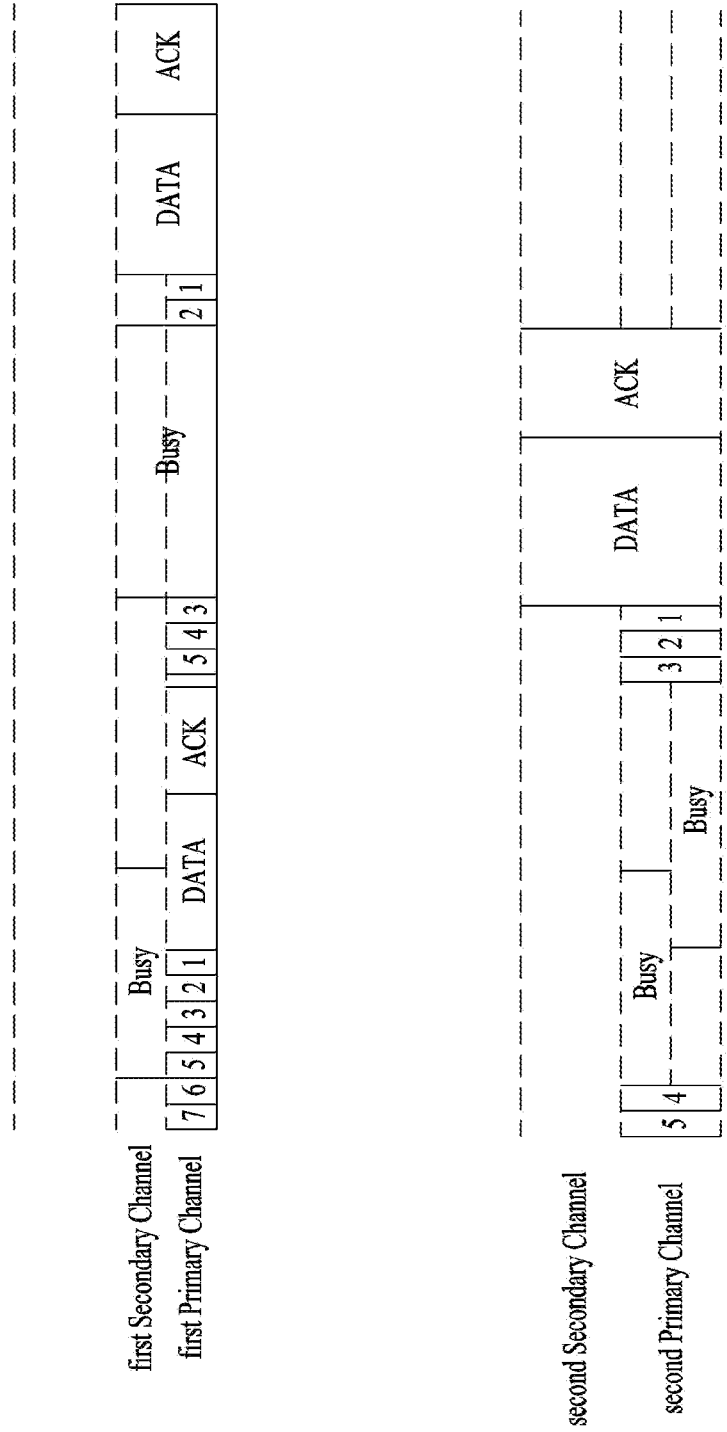
FIG. 20 illustrates exemplary backoff processes of STAs.

FIG. 20 illustrates exemplary backoff processes of STAs.

FIG. 20(a) illustrates the backoff process of an LR STA, and FIG. 20(b) illustrates the backoff process of an HR STA. In the examples of FIG. 20(a) and FIG. 20(b), it is assumed that the LR STA and the HR STA starts backoff at the same time and that 7 and 5 are selected as backoff timer values.

In the example of FIG. 20(a), the LR STA performs channel sensing only on the first primary channel and performs the backoff process according to the result of the channel sensing to decrease the backoff timer to 7, 6, 5, 4, 3, 2, and 1. Although the first secondary channel is in the Busy state due to communication of another BSS, the backoff timer reaches 0 regardless of the state of the first secondary channel since the LR STA performs channel sensing on the first primary channel. Thereby, the STA may be allowed to begin a transmission opportunity (TXOP) and perform transmission of a data frame. Since the first secondary channel is in the busy state at the time the back of timer reaches 0, the LR STA cannot use the first secondary channel for transmission of a data frame, and may use only the first primary channel to transmit the data frame (i.e., a PPDU frame using the 1 MHz channel bandwidth). Thereafter, the LR STA may receive an ACK frame from the AP.

The LR STA may additionally perform the backoff process again in order to send data. The LR STA having selected 5 as the random backoff timer value count down the backoff timer from 5 to 3 on the first primary channel while the channel is in the idle state. At this time, the first primary channel becomes busy due to transmission of a data frame from the HR STA. Thereby, the LR STA stops countdown of the backoff timer. After the HR STA completes transmission of the data frame and reception of an ACK frame, the LR STA resumes the backoff process while the first primary channel is idle. Thereby, the backoff timer counts down from 2 to 1, and then reaches 0. Once the backoff timer value becomes 0, the STA may transmit a data frame, determining that the STA is allowed to begin TXOP. Since the first secondary channel is in the idle state at the time the backoff timer reaches 0, the LR STA may transmit a data frame (i.e., a PPDU frame employing the 2 MHz channel bandwidth) using both the first primary channel and the second secondary channel.

In the example of FIG. 20(b), the HR STA performs channel sensing on the second primary channel and performs a backoff process according to the result of the sensing to decrease the backoff timer to 5 to 4. At this time, if the second primary channel becomes busy due to use of a part of the second primary channel (i.e., a part corresponding to the first secondary channel) by another LR STA, the HR STA freezes countdown of the backoff timer. Even if the part of the second primary channel (i.e., the part corresponding to the first secondary channel) becomes idle, the second primary channel is determined to be busy if the other part of the second primary channel (i.e., the part corresponding to the first primary channel) is busy. Accordingly, when none of the parts of the second primary channel is busy (i.e., the entirety of the second primary channel is in the idle state), the HR STA resumes countdown of the backoff timer to reduce the value of the backoff timer from 3 to 1. Once the backoff timer reaches 0, the HR STA may transmit a data frame, determining that the STA is allowed to begin TXOP. Herein, since the second secondary channel is in the idle state, the HR STA may transmit a data frame (i.e., a 4 MHz PPDU frame) using both the second primary channel and the second secondary channel.

It can be seen from the examples of FIG. 20 that the LR STA is more likely to obtain the TOXP than the HR STA. That is, although the LR STA and the HR STA perform a backoff process using the first primary channel and the second primary channel, the probability of the whole second primary channel being in the idle state is generally lower than the probability of the first primary channel being in the idle state, and accordingly the HR STA is less likely to decrease the backoff count than the LR STA. As a result, the HR STA is less likely to obtain the TXOP than the LR STA. That is, fairness is lost in terms of channel access of the LR STA and the HR STA.

To address this problem, the LR STA and the HR STA may be allowed to perform backoff only on the first primary channel. For example, both the LR STA and the HR STA may be caused in common to support only the reception capability for the first primary channel, and the backoff mechanism of the LR STA and the HR STA may be restricted to be performed only on the first primary channel.

For example, in a BSS supporting 1 MHz, 2 MHz, 4 MHz, 8 MHz, and 16 MHz channel bandwidths, both the LR STA and the HR STA support the reception capability for 1 MHz transmission, and perform the backoff mechanism on the 1 MHz channel in common. If channel sensing is performed only on the 1 MHz channel and the backoff timer reaches 0 through the backoff process, the corresponding STA (i.e., either the LR STA or the HR STA) may transmit data, determining that the STA is allowed to begin TXOP. Herein, regardless of whether or not the secondary channel is idle/busy during backoff countdown, transmission of the 1 MHz, 2 MHz, 4 MHz, 8 MHz or 16 MHz PPDU frame may be determined depending on whether the secondary channel(s) are idle/busy after the backoff timer of the STA reaches 0. In addition, depending on the transmission capability of the STA, the bandwidth of a data frame to be transmitted after the backoff timer reaches 0 may be limited.

That is, both the LR STA and the HR STA uses the first primary channel to perform the backoff mechanism, and the transmission bandwidth for data transmission is determined depending on the transmission capability of the STA whose backoff timer has reached 0 and whether or not the first secondary channel and the second secondary channel are idle/busy.

According to this operation scheme, since data transmission using only the first primary channel (i.e., primary 1 MHz channel) is not supported for the HR STA (i.e., the HR STA is to use at least the second primary channel second primary channel (i.e., primary 2 MHz channel) for data transmission), the HR STA may fail to perform data transmission when all the secondary channels are busy and only the first primary channel is in the idle state even if the TXOP is allowed to begin.

In this case, the HR STA may perform the backoff process again. Herein, this backoff process, which is different from a new backoff process invoked by collision, may be performed while the previous CW value is maintained rather than being doubled and the retransmission countdown is not changed.

However, this scheme may still have a problem of inefficiency as channel access cannot be performed even if fairness of channel access is provided to the LR STA and the HR STA and the HR STA successfully completes backoff countdown.

As another method to address the problem of losing fairness of channel access of the LR STA and the HR STA is in the example of FIG. 20, the LR STA and the HR STA may support a reception capability for the second primary channel in common, and the backoff mechanism of the LR STA and the HR STA may be restricted to being performed only on the second primary channel.

For example, in a BSS supporting 1 MHz, 2 MHz, 4 MHz, 8 MHz, and 16 MHz channel bandwidths, the LR STA and the HR STA support the reception capability for 2 MHz transmission in common, and the backoff mechanisms thereof are performed on the 2 MHz channel in common. If channel sensing is performed only on the 2 MHz channel and beginning of TXOP is allowed through the backoff process (or the backoff timer reaches 0), the corresponding STA (i.e., either the LR STA or the HR STA) may transmit data. Herein, once the backoff timer reaches 0, transmission of a 1 MHz or 2 MHz PPDU frame may be performed depending on whether or not the first primary channel, first secondary channel, and second primary channel are idle/busy. In addition, regardless of whether or not the second secondary channel is idle/busy during backoff countdown, transmission of the 4 MHz, 8 MHz or 16 MHz PPDU frame may be determined depending on whether the second secondary channel is idle/busy after the backoff timer of the STA reaches 0. In addition, depending on the transmission capabilities of the STA, the bandwidth of a data frame to be transmitted after the backoff timer reaches 0 may be limited.

That is, both the LR STA and the HR STA use the second primary channel to perform the backoff mechanism, and the transmission bandwidth for data transmission is determined depending on the transmission capability of the STA for which the TXOP is allowed to begin (or the backoff timer has reached 0) and whether or not the first primary channel, first secondary channel, and second secondary channel are idle/busy.

According to this operation scheme, fairness of channel access may be provided to the LR STA and the HR STA.

However, if the first primary channel is idle and the first secondary channel is busy, the LR STA intending to transmit a 1 MHz PPDU frame cannot continue backoff countdown since the second primary channel is busy. In this case, utilization of the first primary channel in the idle state is prevented, and accordingly efficiency of utilization of bandwidths in the whole system is degraded.

To address this problem, the present invention proposes that the LR STA perform the backoff process using the first primary channel and if the TXOP is allowed to begin as a result of the backoff process (or the backoff timer reaches 0), data transmission be performed only on the first and primary channel without allowing use of the second secondary channel even if the second secondary channel is idle.

In other words, in the case that a channel obtained by bonding the first primary channel and the first secondary channel identical to the second primary channel, if the TXOP is allowed to begin as a result of the backoff process performed on the first primary channel (or the backoff timer reaches 0), transmission of data on the second primary channel is prohibited, while transmission of data on the first primary channel is allowed. This may be the least action taken to address the problem of fairness between the LR STA and HR STA, compared to the backoff process performed on the second primary channel for the HR STA to transmit data on the second primary channel.

This scheme may be understood as meaning that the LR STA should perform the backoff process on the second primary channel from the start rather than only on the first of primary channel when the LR STA intends to transmit data using both the first primary channel and the first secondary channel (namely, on the second primary channel).

Figure 21:
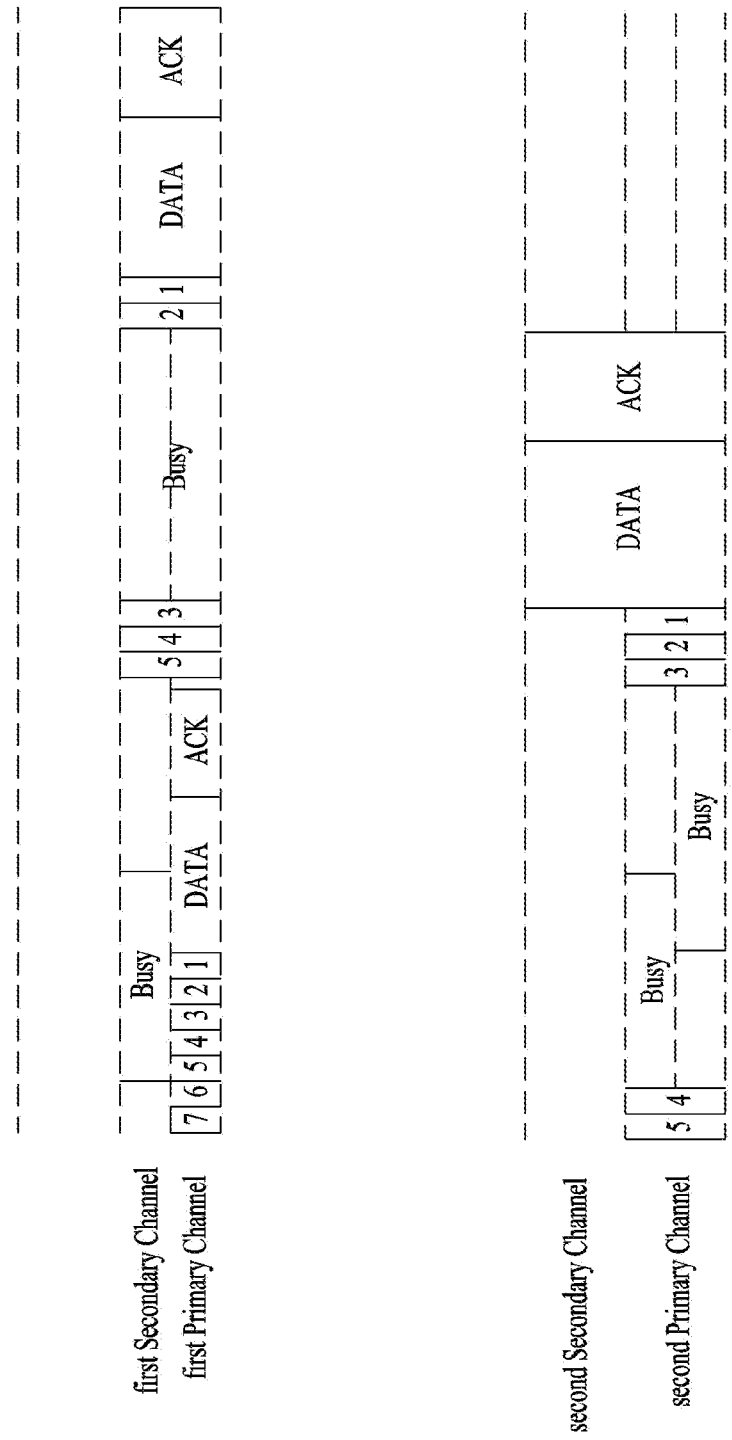
FIG. 21 is a diagram illustrating an exemplary backoff process of an STA according to an embodiment of the present invention.

FIG. 21 is a diagram illustrating an exemplary backoff process of an STA according to an embodiment of the present invention.

If the LR STA intends to transmit data using both the first primary channel and the first secondary channel (or a PPDU employing a channel bandwidth greater than or equal to 2 MHz) as in the example of FIG. 21, the LR STA may count down from the backoff timer value to 0 only if both the first primary channel and the second secondary channel are idle.

When it is assumed that an STA has the capabilities of the LR STA and the HR STA (e.g., supporting transmission on all of the 1 MHz, 2 MHz, 4 MHz, 8 MHz, and 16 MHz channel bandwidths), the STA cannot perform data transmission on 2 MHz, 4 MHz, 8 MHz, 16 MHz channels if the STA is allowed to begin the TXOP as a result of the backoff process performed on the 1 MHz channel (or the backoff timer reaches 0). That is, transmission of data using both the second primaries channel and the second secondary channel is prohibited after the backoff mechanism is performed on the first primary channel.

In summary, if the STA performs the backoff process on the first primary channel, the STA is allowed to perform transmission of data (or a PPDU employing the 1 MHz channel bandwidth) using only the first primary channel. If the STA performs the backoff process on the first primary channel and the first secondary channel (i.e., the second primary channel), the STA may perform transmission of a data frame (or a PPDU employing the 2 MHz channel bandwidth) using only the second primary channel or transmission of a data frame (or a PPDU employing the 4 MHz channel bandwidth) using both the second primary channel and the second secondary channel depending on the channel state of the second secondary channel once the TXOP is allowed to begin (or the backoff timer reaches 0).

While FIGS. 20 and 21 illustrate that the STA transmits a data unit (or PPDU) of a maximum of 4 MHz bandwidth, embodiments of the present invention are not limited thereto. The principle of the present invention may also be applied in the event that a PPDU having a channel bandwidth greater than or equal to the 8 MHz bandwidth is transmitted. For example, if the first backoff process is performed on the first primary channel (or the 1 MHz primary channel), and the TXOP is allowed to begin as a result of the first backoff process, the transmission of a 1 MHz PPDU is allowed (i.e., transmission of a PPDU having a size greater than or equal to 2 MHz is not performed). If the second backoff process is performed on the second primary channel (or the 2 MHz primary channel), and the TXOP is allowed to begin as a result of the second backoff process, a 2 MHz PPDU (if only the 2 MHz second primary channel is idle), a 4 MHz PPDU (if both the 2 MHz second primary channel and the 2 MHz second secondary channel are idle), an 8 MHz PPDU (if the 2 MHz second primary channel, the 2 MHz second secondary channel, and the 4 MHz second secondary channel are all idle), or a 16 MHz PPDU (if the 2 MHz second primary channel, the 2 MHz second secondary channel, the 4 MHz second secondary channel, and the 8 MHz second secondary channel are all idle) may be transmitted depending on whether the second secondary channel (the second secondary channel having the size of 2 MHz, 4 MHz, or 8 MHz) is idle in the PIFS (point coordination function (PCF) interframe space) interval immediately before the TXOP begins.

CCA Threshold

In the present invention, when an STA performs the backoff process for the first primary channel and the second primary channel, the CCA operation for determining whether the channel is idle/busy is mainly determined based on a CCA threshold (or CCA power threshold). For example, if the intensity of a received signal detected on a channel is higher than or equal to a CCA threshold, it may be determined that the channel is busy. As the CCA threshold increases, protection of other signals may be degraded (i.e., the probability of collision with signals transmitted from other devices may increase). As the CCA threshold decreases, protection of other signals may be enhanced (i.e., the probability of collision with signals transmitted from other devices may decrease).

Meanwhile, the LR STA and the HR STA have different usage scenarios. The LR STA desires to a short distance service with low power, and the HR STA desires to obtain high throughput rather than low power consumption. Since the LR STA and the HR STA serve different purposes, a CCA threshold by which the LR STA and the HR STA determines whether a channel (or medium) is idle/busy needs to change depending on the environment.

In the present invention proposes that two or more CCA thresholds be defined. For example, an LR CCA threshold and an HR CCA threshold may be separately defined, and the HR CCA threshold may be set to be higher than the LR CCA threshold. For example, if a signal lower than the HR CCA threshold and higher than the LR CCA threshold is detected, an STA adopting the HR CCA threshold determines that the channel is not busy (i.e., the channel is idle), while an STA adopting the LR CCA threshold determines that the channel is busy. The STA adopting the HR CCA threshold may protect signals transmitted from other devices to a lower degree than the STA adopting the LR CCA threshold. Accordingly, the STA adopting the HR CCA threshold needs to set the service range to be narrower than the service range set by the STA adopting the LR CCA threshold.

The present invention, it is assumed that an STA uses basically (or as a default value) the HR CCA threshold. If the service of the STA is interrupted by an interference signal, the STA may transmit, to the AP, a management frame requesting HR CCA Prohibit. Upon receiving the management frame requesting HR CCA Prohibit, the AP may broadcast a management frame instructing HR CCA Prohibit to all STAs belonging to the S1G BSS. In addition, STA(s) receiving, from the AP, the management frame instructing the HR CCA Prohibit change the CCA threshold from the HR CCA threshold to the LR CCA threshold.

If BSAs of different BSSs overlap partially or fully and the BSSs operate on the same channel, the BSSs are called OBSSs. If STA(s) receive a management frame instructing HR CCA Prohibit from the AP of a neighboring BSS in an environment having OBSSs, the STA(s) change the CCA threshold to the LR CCA threshold. Thereby, the STA may use the CCA threshold changed to the LR CCA threshold, but this operation is not persistently applied. This is because the LR CCA threshold becomes unnecessary if the AP of a neighboring BSS having sent the HR CCA Prohibit management frame does not provide the service anymore.

Accordingly, the STA(s) receiving the management frame instructing the HR CCA Prohibit may change the CCA threshold from the HR CCA threshold to the LR CCA threshold and apply the same for a certain time (e.g., HR CCA Prohibit timeout). After the HR CCA Prohibit timeout passes, the CCA threshold is changing back to the HR CCA threshold. Accordingly, if the STA desires to persistently change the CCA threshold to the LR CCA threshold, the management frame instructing the HR CCA Prohibit needs to be continuously transmitted with a periodicity less than the HR CCA Prohibit timeout.

The management frame requesting the HR CCA Prohibit may include information designating the time for which the HR CCA Prohibit is applied (e.g., HR CCA Prohibit start time, HR CCA Prohibit timeout, etc.). That is, if a service for an STA is interrupted by an interference signal, information about the HR CCA Prohibit start time and the HR CCA Prohibit timeout which indicate the time interval during which the interference signal is generated may be included in the management frame requesting the HR CCA Prohibit for the time interval.

In addition, when the AP transmits a management frame instructing HR CCA Prohibit, information such as the HR CCA Prohibit start time and HR CCA Prohibit timeout which indicate a specific time interval may be included in the management frame instructing the HR CCA Prohibit in order to command HR CCA Prohibit for the specific time interval.

STA(s) receiving an HR CCA Prohibit management frame containing HR CCA Prohibit start time and HR CCA Prohibit timeout may change the CCA threshold from the HR CCA threshold to the LR CCA threshold only for a time interval specified by the HR CCA Prohibit start time and the HR CCA Prohibit timeout and apply the same. For an undesignated time interval, the HR CCA threshold may be used.

If the AP or STA receiving the management frame for the HR CCA Prohibit switches to another channel, the HR CCA Prohibit is not applied to the channel to which the AP or STA switches. This means that signaling of HR CCA Prohibit is performed per channel. If the AP receiving the HR CCA Prohibit management frame performs channel switching, when the STA receiving the HR CCA Prohibit management frame performs scanning on another channel, signaling of the previously received HR CCA Prohibit may be ignored, and the HR CCA threshold may be used to perform channel access.

Dynamic CCA

In order to achieve a high throughput targeted by the unvested WLAN system (e.g., aggregated throughput greater than or equal to 1 Gbps which a BSS of the IEEE 802.11ac VHT system can provide) in a real environment, multiple non-AP STAs need to use a channel simultaneously. To this end, an AP STA may use space division multiple access (SDMA) or MU-MIMO. That is, simultaneous transmission and reception between multiple non-AP STAs and the AP STA is allowed.

In addition, in supporting a further extended channel bandwidth (e.g., the 160 MHz channel bandwidth of the VHT system), legacy STAs of IEEE 802.11a/n may operate at various locations in a frequency band, and thus it is not easy to discover a contiguous 160 MHz channel which is not used by the legacy STAs. Accordingly, an extended channel bandwidth obtained by aggregating non-contiguous channels needs to be used.

Figure 22:
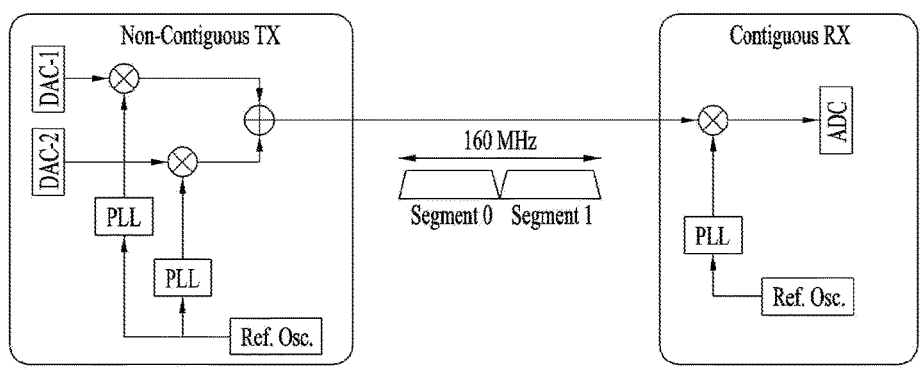
FIG. 22 is a block diagram illustrating transmission employing a non-contiguous channel.

FIG. 22 is a block diagram illustrating transmission employing a non-contiguous channel.

In FIG. 22, each of outputs of two digital-to-analog converters (DAC) is multiplied by an output of a reference oscillator (Ref. Osc.) via the phase locked loop (PLL) on the transmission side performing non-continuous transmission (TX). A resultant of multiplication of the output of DAC-1 and the output of the Ref. Osc. via the PLL and the resultant of multiplication of the output of DAC-2 and the output of the Ref. Osc. via the PLL may be transmitted on a wireless medium via the ADD operation. Herein, the output of DAC-one may correspond to the first segment (Segment 0) of the 160 MHz channel bandwidth, and the output of DAC-2 may correspond to the second segment (Segment 1) of the 160 MHz channel bandwidth. The transmission side performing non-contiguous TX may position the two frequency segments thereof next to each other in order to communicate with the reception side performing contiguous reception (RX).

Figure 23:
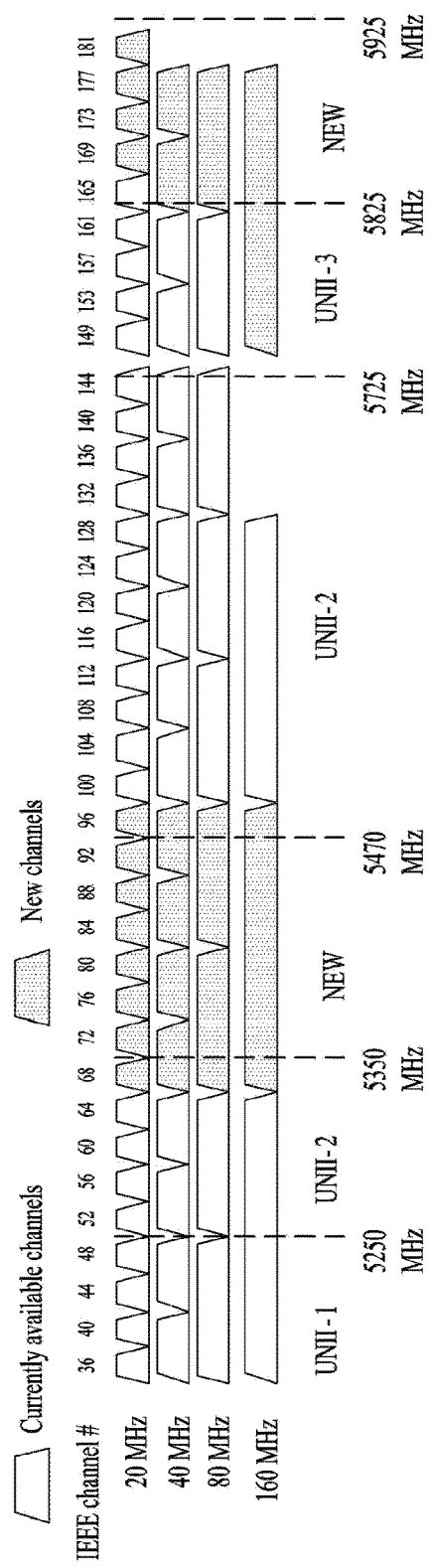
FIG. 23 is a diagram illustrating channels available to the WLAN system in the 5 GHz band.

FIG. 23 is a diagram illustrating channels available to the WLAN system in the 5 GHz band.

With increase in demand for massive data transmission (e.g., high-definition multimedia transmission), extending an unlicensed band available to the WLAN system is under discussion. FIG. 23 shows frequency locations of channels currently available to the IEEE 802.11ac system in the 5 GHz band and new channels which will be additionally available in the future.

The currently available channels include UNII (Unlicensed National Information Infrastructure)-1, UNII-2, UNII-3, UNII3. UNII-1 is referred to as UNII Low and is defined to be located in a band between 5150 Hz and 5250 Hz. UNII-2 is referred to as UNII Mid, and includes a portion located in a band between 5250 Hz and 5350 Hz and a portion located in a band between 5470 Hz and 5725 Hz which is referred to as UNII-2e or UNII-Worldwide. UNII-3 is referred to as UNII-Upper, and is defined to be located in a band between 5725 Hz and 5825 Hz.

As shown in FIG. 23, considering channels which are newly added to the 5350 MHz-5470 MHz band and the 5825 MHz-5925 MHz band, the number of available 80 MHz channels increases from 6, which is the current number, to 9. In addition, the number of available 160 MHz channels increases from 2, which is the current number, to 4.

In order to effectively support the amount of data, which is gradually increasing, it is becoming important to extend the unlicensed band available to the WLAN system and improve efficiency of the WLAN protocol. In particular, it is important to increase a spatial reuse gain in an environment where a large number of APs are densely present.

The present invention proposes dynamic CCA for maximizing efficiency of use of a wireless medium with the CSMA/CA technique which the WLAN system basically employs.

Hereinafter, use of 20 MHz, 40 MHz, 80 MHz, and 160 MHz channel bandwidths according to an embodiment of the present invention will be mainly described. It is apparent to those skilled in the art that the same principle described below is applicable to operation employing other channel bandwidths (2 MHz, 4 MHz, 8 MHz, 16 MHz) in another band (e.g., S1G band). In the following example, the minimum bandwidth of a primary channel will be expressed as W MHz. In a WLAN system operating in the 5 GHz band, W may be 20. In a WLAN system operating in the S1G band, W may be 2. It is apparent that the backoff operation including the proposed CCA technique is applicable to a case where the size of the minimum primary channel bandwidth is 1 (i.e., W=1) as described above.

The proposed dynamic CCA technique may include varying a CCA parameter for respective BSSs. In addition, the proposed dynamic CCA technique may include applying a CCA parameter (or CCA condition) that is distinguished according to the channel width of a data unit (PPDU) that is to be transmitted.

The CCA operation may be viewed as an operation of determining that a specific operation channel is occupied by another STA when the receive power greater than or equal to A dBm is detected (e.g., when start of PPDU greater than or equal to A dBm is sensed) on the operation channel. If the operation channel is determined to be busy as a result of CCA, the STA freezes the current backoff process (i.e. countdown of the backoff counter), and waits until it is determined that the operation channel is in the idle state.

The commercial CCA operation and backoff operation are summarized below. Basically, all STAs may perform a backoff process on the primary W MHz channel. That is, when the backoff timer is set within a range between 0 and CWmin, and it is determined that the channel is idle as a result of CCA of the primary W MHz channel for the backoff slot time, the backoff timer may count down to 0.

Once the backoff timer reaches 0, the STA may transmit a DATA frame on the channel. At this time, an RTS frame may be transmitted first, and a CTS frame may be received from the destination STA. Then, a DATA frame may be transmitted. Alternatively, the DATA frame may be transmitted to the destination STA without exchange of the RTS frame and the CTS frame.

If an STA other than the destination STA receives the RTS frame, the CTS frame, the DATA frame, or an ACK frame, an NAV value is set to delay channel access in order to avoid simultaneous transmission (or a collision) of the STAs on the corresponding channel. The backoff timer does not decrease for a time corresponding to the set NAV even if it is determined that the channel is idle as a result of CCA.

Herein, according to the CCA operation of the present invention, if it is determined that the wireless medium (WM) is occupied by other STAs, backoff may be continued by increasing the primary channel bandwidth.

That is, STAs (i.e., third STAs or a third party STAs) receiving (or overhearing) an RTS frame or a CTS frame transmitted from a certain STA may predict, through the Duration field of the RTS frame or CTS frame, the time for which the certain STA uses the channel, and set an NAV. In this case, the third party STAs may perform CCA by increasing the primary channel bandwidth, thereby continuing backoff.

For example, the third party STAs may perform CCA by doubling the primary channel bandwidth. In this case, the primary channel CCA primary may be changed. For example, if the CCA is performed by doubling the primary channel bandwidth, the CCA threshold may be increased by 3 dBm. The third party STAs may continue the backoff process using the changed CCA parameter.

Herein, when the primary channel bandwidth which is subjected to backoff (or CCA) is W MHz, the backoff (or CCA) process may be understood as being intended for transmission of a data unit (i.e., PPDU) having a channel bandwidth of W MHz (or a channel bandwidth greater than or equal to W MHz). If the backoff process is intended for transmission of a data unit having a channel bandwidth of W MHz (or a channel bandwidth greater than or equal to W MHz), it may be determined, on a primary channel having the size of W MHz, whether the channel is busy/idle, based on the CCA threshold of A dBm. Thereby, the backoff process may be performed according to the determination. If the backoff process is intended for transmission of a data unit having a channel bandwidth of 2 W MHz (or a channel bandwidth greater than or equal to 2 W MHz), it may be determined on a primary channel having the size of 2 W MHz whether the channel is busy/idle, based on the CCA threshold of A+3 dBm. Thereby, the backoff process may be performed according to the determination.

For example, if CCA is performed for a primary channel having the size of 20 MHz using a CCA threshold of A dBm, the busy state of the 20 MHz primary channel may be detected. On the other end, if CCA is performed for a primary channel having the size of 40 MHz using a CCA threshold of A+3 dBm, it may be determined that the channel is idle. If the channel is determined to be idle as a result of CCA performed by an STA for a primary channel having the size of 40 MHz using the CCA threshold of A+3 dBm, the backoff timer may count down to 0. Once the backoff timer reaches 0, the STA must transmit a data frame using (including) the 40 MHz primary channel. That is, the STA must to transmit a data unit (e.g., PPDU) employing a channel width greater than or equal to 40 MHz. If the STA performs the backoff process for a primary channel having the size of 40 MHz using a CCA threshold of A+3 dBm, the STA is prohibited from transmitting a PPDU having a channel width less than 40 MHz during TXOP. For example, the backoff process may be performed on the primary channel having the size of 20 MHz using the CCA threshold of A dBm 20 MHz when a data unit having a channel width greater than or equal to 20 MHz needs to be transmitted, and may be performed on the primary channel having the size of 40 MHz using the CCA threshold of A+3 dBm when a data unit having the channel width greater than or equal to 40 MHz is to be transmitted.

If the channel is still busy after the backoff process is performed on the primary channel having the size of 40 MHz using the CCA threshold of A+3 dBm, the STA may perform the backoff process using a primary channel having a size twice the size of the previous primary channel and the CCA threshold increased by 3 dBm (to A+6 dBm) as the CCA parameter. For example, if the channel is determined to be idle as a result of CCA performed on the primary channel having the size of 80 MHz using the CCA threshold of A+6 dBm, the backoff timer may count down to 0. Herein, when the backoff timer reaches 0, the STA must transmit a data frame using (or including) the 80 MHz primary channel. If the STA performs the backoff process for the 80 MHz primary channel using the CCA threshold of A+6 dBm, the STA is prohibited from transmitting the PPDU having a channel width less than 80 MHz during the TXOP. In brief, if a data unit having a channel width greater than or equal to 20 MHz needs to be transmitted, the STA may perform the backoff process on a primary channel having the size of 20 MHz using the CCA threshold of A dBm. If a data unit having a channel width greater than or equal to 40 MHz needs to be transmitted, the STA may perform the backoff process on a primary channel having the size of 40 MHz using the CCA threshold of A+3 dBm. If a data unit having a channel width greater than or equal to 80 MHz needs to be transmitted, the STA may perform the backoff process on a primary channel having the size of 80 MHz using the CCA threshold of A+6 dBm.

If the channel is still busy after the backoff process is performed on the primary channel having the size of 80 MHz using the CCA threshold of A+6 dBm, the STA may perform the backoff process using a primary channel having a size twice the size of the previous primary channel and the CCA threshold increased by 3 dBm (to A+9 dBm) as the CCA parameter. For example, if the channel is determined to be idle as a result of CCA performed on the primary channel having the size of 160 MHz using the CCA threshold of A+9 dBm, the backoff timer may count down to 0. Herein, when the backoff timer reaches 0, the STA must transmit a data frame using (or including) the 160 MHz primary channel. If the STA performs the backoff process for the 160 MHz primary channel using the CCA threshold of A+9 dBm, the STA is prohibited from transmitting the PPDU having a channel width less than 160 MHz during the TXOP. In brief, if a data unit having a channel width greater than or equal to 20 MHz needs to be transmitted, the STA may perform the backoff process on a primary channel having the size of 20 MHz using the CCA threshold of A dBm. If a data unit having a channel width greater than or equal to 40 MHz needs to be transmitted, the STA may perform the backoff process on a primary channel having the size of 40 MHz using the CCA threshold of A+3 dBm. If a data unit having a channel width greater than or equal to 80 MHz needs to be transmitted, the STA may perform the backoff process on a primary channel having the size of 80 MHz using the CCA threshold of A+6 dBm. If a data unit having a channel width greater than or equal to 160 MHz needs to be transmitted, the STA may perform the backoff process on a primary channel having the size of 160 MHz using the CCA threshold of A+9 dBm.

When the width of a primary channel on which CCA is performed is doubled, the STA increases the CCA threshold by 3 dBm for the following reasons. When the output power transmitted by the STA is constant, doubling the width of a channel on which the PPDU is transmitted reduces the output power per unit bandwidth by half. Accordingly, as a channel bandwidth for transmission of the PPDU is doubled, the level of interference applied to other STAs is lowered by half. Thereby, even if the CCA threshold is doubled (i.e., increased by 3 dBm), the actual level of interference applied to other STAs remains constant.

For example, the magnitude of interference caused by an STA which uses power P in transmitting a PPDU having the size of W MHz is X dBm, the magnitude of interference caused by an STA which uses power P in transmitting a PPDU having the size of 2 W MHz may be X−3 dBm. CCA is an operation of detecting whether an interference signal generated by another STA is present on a channel, and when a signal having an interference magnitude greater than or equal to a CCA threshold is detected on the channel, it is determined that the wireless medium (WM) is occupied by another STA. Accordingly, the CCA threshold of STA 1 may be viewed as being related to the level of interference caused by transmission of a PPDU from STA 2. STA 1. Applying a CCA threshold of A dBm to transmission of the W MHz PPDU means that the channel is determined to be busy if the interest level caused by W MHz PPDU transmission of STA 2 is greater than or equal to A dBm. If STA 1 applies the CCA threshold of A dBm to 2 W MHz PPDU transmission, this means that the channel is determined to be busy even if the observed interface level caused by 2 W MHz PPDU transmission of STA 2 is greater than or equal to A dBm. That is, using the CCA threshold of A dBm for both W MHz PPDU transmission and 2 W MHz PPDU transmission may be interpreted as applying a CCA threshold reduced by half, considering that the interference level caused by 2 W MHz PPDU transmission is half the interference level caused by W MHz PPDU transmission. In other words, in the event that the channel waits for transmission from STA 1 is widened, STA 1 should determine that the channel is busy even at a lower interference level if STA 1 does not increase the CCA threshold. If the backoff process is performed based on the CCA operation using the above CCA threshold, fewer opportunities to acquire TXOP are given. Accordingly, in order to prevent imbalance of TXOP acquisition possibility when the channel bandwidth for transmission of a PPDU increases, the CCA threshold may need to be increased.

Accordingly, when a certain STA desires to transmit a PPDU having a size greater than or equal to W MHz, the STA may determine presence of PPDU transmission from other STAs on the channel using A dBm as the CCA threshold. When the STA desires to transmit a PPDU having a size greater than or equal to 2 W MHz, the STA may determine presence of PPDU transmission from other STAs on the channel using A+3 dBm as the CCA threshold.

Figure 24:
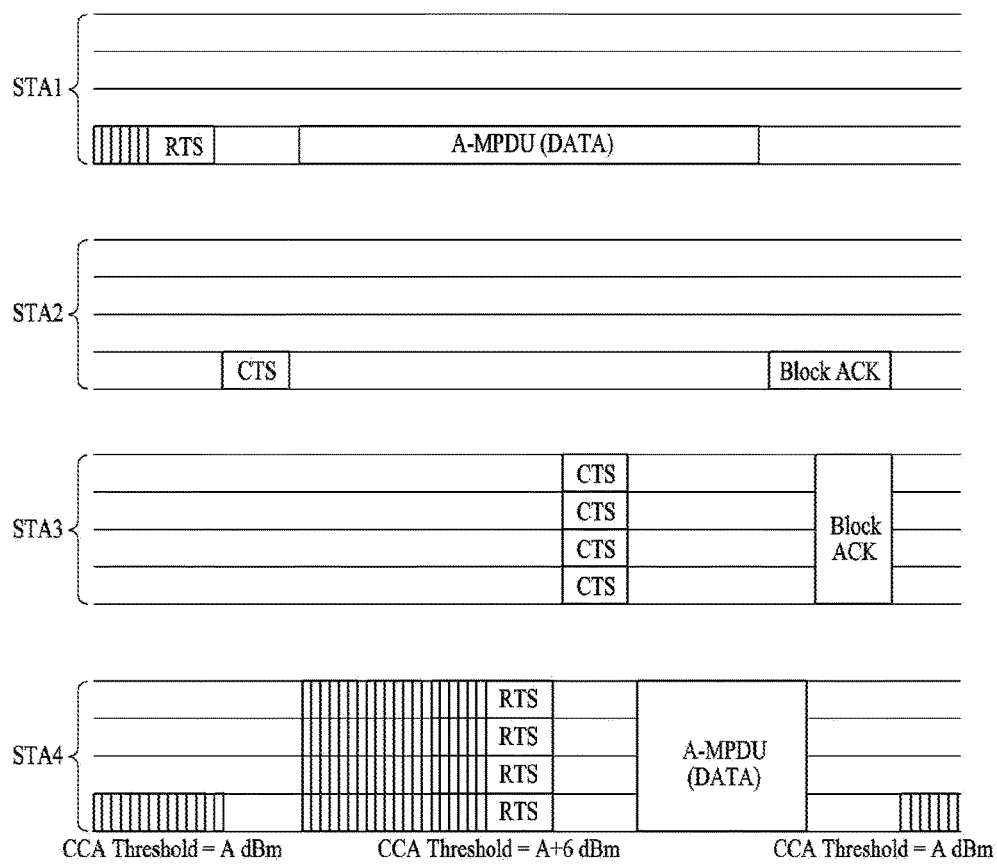
FIG. 24 is a diagram illustrating a CCA technique according to an embodiment of the present invention.

FIG. 24 is a diagram illustrating a CCA technique according to an embodiment of the present invention.

STA1 and STA4 having data to transmit may perform a backoff process on the 20 MHz primary channel. Herein, it is assumed that the CCA threshold on the 20 MHz primary channel is A dBm. When there is a signal received with a power greater than or equal to A dBm, STA1 and STA4 may stop backoff timer countdown, determining that the CCA result value indicates that the channel is busy. It is assumed that the backoff timer start values randomly selected by STA1 and STA4 are different from each other and the backoff timer of STA1 reaches 0 first. Thereby, STA1 may perform frame transmission or reception using a 20 MHz primary channel. For example, STA1 may transmit RTS to STA2, which is the destination STA, and STA2 receiving RTS may transmit CTS to STA1 in response. Thereby, STA1 may transmit A-MPDU(DATA) to STA2, and STA2 may transmit a Block ACK frame to STA1 in response.

STA4, which determines that the 20 MHz primary channel is busy based on the CCA result value due to frames transmitted and received by STA1, may resume backoff by increasing the channel bandwidth by four times (to the 80 MHz primary channel) and the CCA threshold by 6 dBm (to A+6 dBm). In the backoff process according to the increased CCA threshold, backoff timer countdown may be performed based on, for example, the received signal intensity on the whole 80 MHz primary channel or on a part of the 80 MHz primary channel. STA4 having performed the backoff process for the 80 MHz primary channel may perform frame transmission/reception using the 80 MHz primary channel after the backoff timer reaches 0. For example, STA4 may transmit RTS to STA3, and STA3 may transmit CTS to STA4 in response. Thereby, STA4 may transmit A-MPDU (DATA) to STA3, and STA3 may transmit a Block ACK frame to STA4 in response.

Thereafter, STA4 may start new backoff on the 20 MHz primary channel. In this case, the CCA threshold (i.e., A dBm) used for the backoff process on the 20 MHz primary channel may be lower than the CCA threshold for the 80 MHz primary channel by 6 dBm.

Meanwhile, in the example of FIG. 24, the CTS frame and Block ACK frame transmitted by STA3 may interrupt communication between STA1 and STA2. To address this problem, a specific STA may make a request to other STAs for implementation of dynamic CCA.

Figure 25:
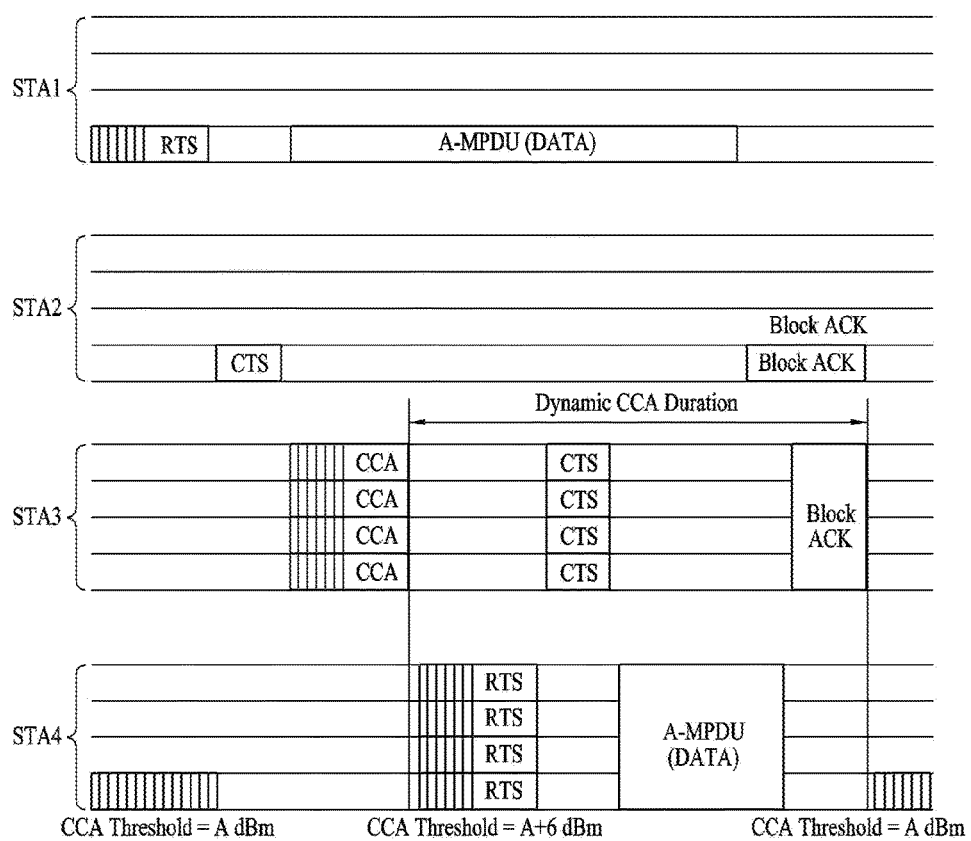
FIG. 25 is a diagram illustrating a CCA technique according to another embodiment of the present invention.

FIG. 25 is a diagram illustrating a CCA technique according to another embodiment of the present invention.

In the example of FIG. 25, STA3 may predict the channel use times of STA1 and STA2 through the Duration field included in the RTS/CTS frames exchanged between STA1 and STA2. If STA3 is an AP, STA3 may announced, to all STAs belonging to the BSS of STA 3, that STA3 has determined that the channel is idle as a result of CCA which STA3 performed for the 80 MHz primary channel. A frame used for an STA to announce the CCA result thereof to other STAs may be referred to as the CCA control frame. To transmit the CCA control frame, STA3 may perform the backoff process on an 80 MHz primary channel (i.e., the 80 MHz primary channel that is determined to be idle as a result of CCA), and transmit the CCA control frame using the 80 MHz primary channel when the backoff timer reaches 0. An STA receiving the CCA control frame may change the CCA parameter thereof based on the dynamic CCA duration information, CCA bandwidth information, CCA threshold level information and the like which are contained in the CCA control frame, and resume the backoff process based on the changed CCA parameter.

Herein, the dynamic CCA duration information indicates that STAs belonging to a BSS constituted by the AP (e.g., STA3) should perform channel access using the changed CCA primary for a time indicated by the duration value. The CCA bandwidth information indicates a CCA bandwidth which STAs should use for the dynamic CCA duration. The CCA threshold level information indicates a threshold level of the CCA which the STAs use for the dynamic CCA duration. That is, if a signal whose level is higher than or equal to the indicated CCA threshold level is detected on the indicated CCA bandwidth for the CCA duration indicated through the CCA control frame, it may be determined that the WM of the corresponding bandwidth is in the busy state.

After the indicated CCA duration expires, the STA having received the CCA control frame and performed the channel access process based on the changed CCA parameter for the indicated CCA duration may restore the original CCA parameter value and restart the channel access process.

Additionally, in performing CCA and the backoff process based on the increased CCA threshold on the increased primary channel bandwidth in the examples of the present invention, determining whether or not the WM is busy/idle based on the increased CCA threshold on the increased primary channel bandwidth may be implemented in various manners.

As a first example, if the backoff process is performed by setting the CCA threshold of the 40 MHz primary channel to a value (e.g., A+3 dBm) greater than the CCA threshold (e.g., A dBm) of the 20 MHz primary channel by 3 dBm, whether or not the WM is busy/idle may be determined by comparing the intensity of the received signal on the whole 40 MHz primary channel with the CCA threshold (e.g., A+3 dBm). For example, if the intensity of the received signal on the whole 40 MHz primary channel is greater than the CCA threshold (e.g., A+3 dBm), it may be determined that the WM is busy.

As a second example, whether or not the WM is busy/idle may be determined by comparing the intensity of the received signal on only a part of the 40 MHz primary channel with the CCA threshold. For example, if the intensity of the received signal on the 20 MHz channel which is a part of the 40 MHz primary channel is greater than the CCA threshold (e.g., A+3 dBm), it may be determined that the WM is busy.

According to the second example, the channel bandwidth sampled in the backoff process of the STA to determine whether or not the channel is busy/idle does not change (i.e., both CCA for the 20 MHz primary channel and CCA for the 40 MHz primary channel are performed based on the intensity of the received signal on the 20 MHz channel), and accordingly implementation of the present invention is simplified. However, there are additional considerations in view of the MAC protocol.

For example, in performing PPDU transmission after the backoff timer expires (namely, after the TXOP is acquired), the channel status of only a partial channel (e.g., 20 MHz channel) of a whole channel (e.g., 40 MHz channel) which has been actually used for PPDU transmission in the backoff process is checked, and accordingly it is not sure whether the whole channel for PPDU transmission channel is actually idle. In some cases, even if the TXOP is acquired when the backoff timer expires, the PPDU may actually fail to be transmitted. For example, if the remaining 20 MHz channel (e.g., the secondary 20 MHz the channel) is in the busy state in the PIFS prior to actual PPDU transmission after the backoff timer expires, the PPDU may not be transmitted on the 40 MHz channel. That is, if the remaining 20 MHz channel (e.g., the secondary 20 MHz the channel) is in the idle state in the PIFS prior to actual PPDU transmission after the backoff timer expires, the PPDU may be transmitted on the 40 MHz channel. Accordingly, even if the TXOP is acquired as the backoff timer expires as a result of the backoff process performed based on only a part of the 4 MHz channel, the PPDU may not actually be transmitted, and a new backoff process may need to be performed.

The STA may perform the new backoff process without extending (changing) the contention window parameter used for the previous backoff process.

In examples of the present invention, the operation of performing a backoff process based on an increased CCA threshold when a data unit having a wider channel width needs to be transmitted does not only mean that the backoff process is performed only when the WM is busy as a result of CCA based on a lower CCA threshold in the event that a data unit having a narrower channel width needs to be transmitted. That is, the backoff technique proposed in the present invention is characterized in that the backoff process using a CCA condition (e.g., CCA threshold) differentiated for each channel width of a data unit (or the channel width of a primary channel on which CCA or backoff is performed) is defined. For example, if transmission of a data unit having a size greater than or equal to a first channel width (e.g., W MHz) is intended, performing a first backoff process using a first CCA condition (e.g., a CCA threshold set to A dBm) on the first primary channel corresponding to W MHz or a part thereof may be defined. If the TXOP is allowed as a result of the first backoff process, transmission of the data unit having a size greater than or equal to the first channel width is possible. As a backoff process distinguished from the first backoff process, if transmission of a data unit having a size greater than or equal to a third channel width (e.g., 2 W MHz) is intended, performing a second backoff process using a second CCA condition (e.g., a CCA threshold set to A+3 dBm) on a second primary channel corresponding to 2 W MHz or a part thereof may be defined. If the TXOP is allowed as a result of the second backoff process, transmission of the data unit having a size greater than or equal to the third channel width is possible.

In order to apply the CCA technique proposed in the present invention, a primitive for indicating change of the CCA primary to the PHY layer needs to be defined on the MAC layer of the STA. To this end, the present invention proposes that PHYCONFIG_VECTOR having CCA_LEVEL_TYPE and CCA_CHANNEL_LIST be newly added to the PHY-CONFIG.request primitive. Table 1 given below shows an example of definition of the PHY-CONFIG.request primitive, and Table 2 shows an example of definition of the PHY-CONFIG.confirm primitive.

TABLE 1

PHY-CONFIG.request

Function

This primitive is a request by the MAC sublayer to the local PHY entity to configure the PHY.

Semantics of the service primitive

The primitive provides the following parameter:

PHY-CONFIG.request(

PHYCONFIG_VECTOR

)

When generated

This primitive is generated by the MAC sublayer for the local PHY entity when it desires to change the configuration of the PHY.

Effect of receipt

The effect of receipt of this primitive by the PHY is to apply the parameters provided with the primitive and to configure the PHY for future operation.

TABLE 2

PHY-CONFIG.confirm

Function

This primitive is issued by the PHY to the local MAC entity to confirm that the PHY has applied the parameters provided in the PHY-CONFIG.request primitive.

Semantics of the service primitive

The semantics of the primitive are as follows:

PHY-CONFIG.confirm

This primitive has no parameters.

When generated

This primitive is issued by the PHY to the MAC entity when the PHY has received and successfully applied the parameters in the PHY-CONFIG.request primitive.

Effect of receipt

The effect of the receipt of this primitive by the MAC is unspecified.

Table 3 given below shows descriptions of exemplary PHYCONFIG_VECTOR, which is included in the PHY-CONFIG.request primitive and includes CCA_CHANNEL_LIST and CCA_LEVEL_TYPE which are newly defined in the present invention.

TABLE 3

| Parameter | Associate vector | Value |
|---|---|---|
| ACTIVE_RXCHAIN_SET | PHYCONFIG_VECTOR | The ACTIVE_RXCHAIN_SET parameter indicates which receive chains of the available receive chains are active. The length of the field is 8 bits. A 1 in bit position n indicates that the receive chain numbered n is used. At most 4 bits out of 8 may be set to 1. |
| OPERATING_CHANNEL | PHYCONFIG_VECTOR | The operating channel the PHY is configured use. |
| CHANNEL_OFFSET | PHYCONFIG_VECTOR | Enumerated type: CH_OFFSET_NONE indicates operation in 20 MHz HT STAs. CH_OFFSET_ABOVE indicates operation in 40 MHz with the secondary channel above the primary. CH_OFFSET_BELOW indicates operation in 40 MHz with the secondary channel below the primary. |
| ANT-CONFIG | PHYCONFIG_VECTOR | Indicates which antenna configuration(s) is to be used when receiving packets and which configuration is to be used when switching configurations during the reception of a packet. Values are implementation dependent. |
| GROUP_ID_MANAGEMENT | PHYCONFIG_VECTOR | The GROUP_ID_MANAGEMENT parameter specifies membership status and STA position for each of the group IDs. |
| PARTIAL_AID_LIST_GID00 | PHYCONFIG_VECTOR | The PARTIAL_AID_LIST_GID00 parameter includes the list of partial AIDs, of which the STA is an intended recipient, associated with group ID 0. |
| PARTIAL_AID_LIST_GID63 | PHYCONFIG_VECTOR | The PARTIAL_AID_LIST_GID63 parameter includes the list of partial AIDs, of which the STA is an intended recipient, associated with group ID 63. |
| LISTEN_TO_GID00 | PHYCONFIG_VECTOR | When true indicates to the PHY not to filter out PPDUs with GROUP_ID field equal to the value 0. |
| LISTEN_TO_GID63 | PHYCONFIG_VECTOR | When true indicates to the PHY not to filter out PPDUs with GROUP_ID field equal to the value 63. |
| CCA_CHANNEL_LIST | PHYCONFIG_VECTOR | Indicates which channels are reported in the channel-list parameter in a PHY-CCA.indication primitive generated by a STA. |
| CCA_LEVEL_TYPE | PHYCONFIG_VECTOR | Indicates which type of CCA level is applied to report a PHY-CCA.indication primitive generated by a STA. |

PHYCONFIG_VECTOR corresponding to CCA_CHANNEL_LIST designates a list of channels on which the MAC layer of an STA desires to receive a report from the PHY layer through the PHY-CCA.indication primitive. For example, if the STA considers 40 MHz PPDU transmission based on a CCA threshold increased by 3 dB according to the dynamic CCA technique proposed in the present invention, the STA needs CCA information about the 40 MHz channel, 80 MHz channel, and 160 MHz channel, and need not information about the 20 MHz channel.

Accordingly, the STA may establish a channel set except the 20 MHz primary channel, using CCA_CHANNEL_LIST, and call the PHY-CONFIG.request primitive to deliver the channel set to the PHY layer. Upon receiving PHYCONFIG_VECTOR correspond to CCA_CHANNEL_LIST from the MAC layer, the PHY layer limits, to the channel set designated by CCA_CHANNEL_LIST, channels to be reported through PHY-CCA.indication primitive as targets of CCA.

In addition, according to the proposed CCA technique of the present invention, the STA may change the CCA threshold. That is, one or more different CCA thresholds may be defined, and the STA may use PHYCONFIG_VECTOR corresponding to CCA_LEVEL_TYPE to set a desired CCA threshold on the PHY layer. For example, a few types such as Type 1, Type 2, Type 3 and Type 4 into which the CCA thresholds are classified may be defined, and information about a type which STA desires to use may be encoded with CCA_LEVEL_TYPE. According to the proposed CCA technique, when a CCA threshold of Type 1 is awesome to be A dBm, the CCA thresholds of Type 2, Type 3 and Type 4 may be set to A+3 dBm, A+6 dBm, and A+9 dBm, respectively. In addition, one CCA type may be configured as a set of CCA thresholds. For example, Type 1 may be defined as a set including a CCA threshold for a PPDU of the W MHz channel width, a CCA threshold for a PPDU of the 2 W MHz channel width, a CCA threshold for a PPDU of the 4 W MHz channel width, a CCA threshold for a PPDU of the 8 W MHz channel width, and the like. When the PHY layer and receives PHYCONFIG_VECTOR corresponding to CCA_LEVEL_TYPE from the MAC layer, a CCA threshold reported through the PHY-CCA.indication primitive is determined based on the course on the CCA type.

Table 4 below shows exemplary definition of the PHY-CCA.indication primitive.

TABLE 4

PHY-CCA.indication
Function
This primitive is an indication by the PHY to the local MAC entity of the current state of the medium and to provide observed IPI values when IPI reporting is turned on.
Semantics of the service primitive
The primitive provides the following parameters:
PHY-CCA.indication(
STATE,
IPI-REPORT,
channel-list
)
The STATE parameter can be one of two values: BUSY or IDLE. The parameter value is BUSY if the assessment of the channel(s) by the PHY determines that the channel(s) are not available. Otherwise, the value of the parameter is IDLE.
The IPI-REPORT parameter is present if dot11RadioMeasurementActivated is true and if IPI reporting has been turned on by the IPI-STATE parameter. The IPI-REPORT parameter provides a set of IPI values for a time interval. The set of IPI values may be used by the MAC sublayer for Radio Measurement purposes. The set of IPI values are recent values observed by the PHY entity since the generation of the most recent PHYTXEND.confirm, PHY-RXEND.indication, PHY-CCARESET.confirm, or PHY-CCA.indication primitive, whichever occurred latest.
When STATE is IDLE or when, for the type of PHY in operation, CCA is determined by a single channel, the channel-list parameter is absent. Otherwise, it carries a set indicating which channels are busy. The channel-list parameter in a PHY-CCA.indication primitive generated by a STA contains at most a single element. Below table defines the members of this set.
When generated
This primitive is generated within aCCATime of the occurrence of a change in the status of the channel(s) from channel idle to channel busy or from channel busy to channel idle, or when the elements of the channel-list parameter change; otherwise this primitive is generated when the status of the channel(s) changes from channel idle to channel busy or from channel busy to channel idle, or when the elements of the channel-list parameter change. This includes the period of time when the PHY is receiving data. Refer to specific PHY clauses for details about CCA behavior for a given PHY.
If the STA is an HT STA but not a VHT STA and the operating channel width is 20 MHz, the PHY maintains the channel busy indication until the period indicated by the LENGTH field has expired, where the LENGTH field is
____ In a valid SIGNAL field if the format of the PPDU is NON_HT
____ In a valid HT-SIG field if the format of the PPDU is HT_MF or HT_GF
If the STA is an HT STA but not a VHT STA and the operating channel width is 40 MHz, the PHY maintains the channel busy indication until the period indicated by the LENGTH field has expired, where the LENGTH field is
____ In a valid SIGNAL field if the format of the PPDU is NON_HT and the PPDU is received in the primary 20 MHz channel
____ In a valid HT-SIG field if the format of the PPDU is HT_MF or HT_GF provided that the PPDU is either a 20 MHz PPDU received in the primary channel or a 40 MHz PPDU
Effect of receipt
The effect of receipt of this primitive by the MAC is unspecified.

Table 5 below shows Channel-list parameter elements included in the PHY-CCA.indication primitive.

TABLE 5

| channel-list elements | Meaning |
|---|---|
| primary | For an HT STA that is not a VHT STA, indicates that the primary 20 MHz channel is busy. For a VHT STA, indicates that the primary 20 MHz channel is busy. |

TABLE 5-continued

| channel-list elements | Meaning |
|---|---|
| secondary | For an HT STA that is not a VHT STA, indicates that the secondary channel is busy.<br>For a VHT STA, indicates that the secondary 20 MHz channel is busy. |
| secondary40 | Indicates that the secondary 40 MHz channel is busy. |
| secondary80 | Indicates that the secondary 80 MHz channel is busy. |

Figure 26:
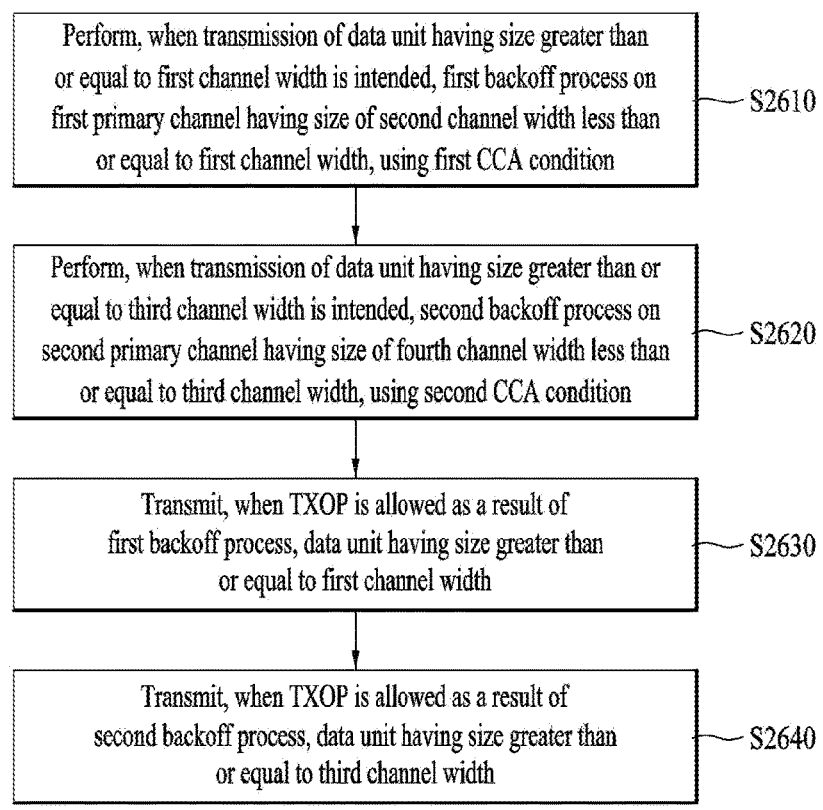
FIG. 26 is a diagram illustrating a backoff method according to an embodiment of the present invention.

FIG. 26 is a diagram illustrating a backoff method according to an embodiment of the present invention.

In step S2610, when transmission of a data unit having a size greater than or equal to a first channel width (e.g., a PPDU having a channel width greater than or equal to W MHz) is intended, a first backoff process may be performed on the first primary channel having the size of a second channel width less than or equal to the first channel width (e.g., the W MHz primary channel or a primary channel and corresponding to a part of W MHz), using a first CCA condition (e.g., a CCA threshold set of Type1 (i.e., a set defined as A dBm for detection of the W MHz PPDU, A+3 dBm for detection of the 2 W MHz PPDU, A+6 dBm for detection of the 4 W MHz PPDU, and A+9 dBm for detection of the 8 W MHz PPDU)).

In step S2620, when transmission of a data unit having a size greater than or equal to a third channel width (e.g., a PPDU having a channel width greater than or equal to 2 W MHz, 4 W MHz or 8 MHz) is intended, a second backoff process may be performed on the second primary channel having the size of a fourth channel width less than or equal to the third channel width (e.g., the 2 W MHz primary channel or a W MHz primary channel), using a second CCA condition (e.g., a CCA threshold set of Type2 (i.e., a set defined as A+3 dBm for detection of the W MHz PPDU, A+6 dBm for detection of the 2 W MHz PPDU, and A+9 dBm for detection of the 4 W MHz PPDU, A+12 dBm for detection of the 8 W MHz PPDU)).

In step S2630, if the TXOP is allowed as a result of the first backoff process, the data unit having a size greater than or equal to the first channel width (e.g., the PPDU having a channel width greater than or equal to W MHz) may be transmitted.

In step S2640, if the TXOP is allowed as a result of the second backoff process, the data unit having a size greater than or equal to the third channel width (e.g., the PPDU having a channel width greater than or equal to 2 W MHz, 4 W MHz or 8 MHz) may be transmitted.

The exemplary method illustrated in FIG. 26 is expressed as a series of operations simplicity of description, and is not intended to limit the order of the steps. When necessary, the steps may be performed simultaneously or in a different order. In addition, not all steps illustrated in FIG. 26 are needed to implement the proposed method.

In the method of the present invention illustrated in FIG. 26, the details described in various embodiments of the present invention may be independently applied or implemented such that two or more embodiments are simultaneously applied.

Figure 27:
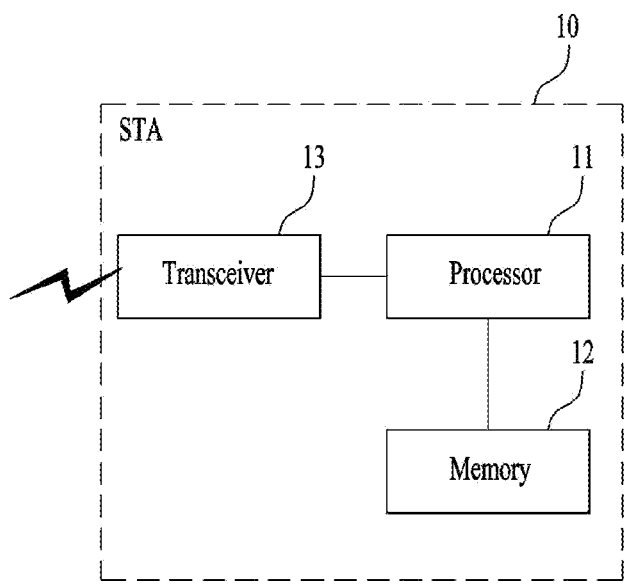
FIG. 27 is a block diagram illustrating configuration of a radio frequency apparatus according to an embodiment of the present invention.

FIG. 27 is a block diagram illustrating configuration of a radio frequency apparatus according to an embodiment of the present invention.

STA 10 may include a processor 11, a memory 12 and a transceiver 13. The transceiver 13 may transmit/receive a radio signal, and implement a physical layer according to, for example, the IEEE 802 system. The processor 11 may be connected to the transceiver 13 to implement a physical layer and/or MAC layer according to the IEEE 802 system. The processor 11 may be configured to perform operations according to various embodiments of the present invention described above. In addition, a module for implementing operations according to various embodiments of the present invention described above may be stored in the memory 12 and executed by the processor 11. The memory 12 may be included in the processor 11 or may be installed outside the processor 11 and connected to the processor 11 through an well-known means.

STA 10 of FIG. 23 may be configured to perform a backoff process for channel access according to the proposed CCA technique in a WLAN system.

When transmission of a data unit having a size greater than or equal to a first channel width (e.g., a PPDU having a channel width greater than or equal to W MHz) is intended, the processor 11 may perform a first backoff process on the first primary channel having the size of a second channel width less than or equal to the first channel width (e.g., the W MHz primary channel or a primary channel and corresponding to a part of W MHz), using a first CCA condition (e.g., a CCA threshold set of Type1 (i.e., a set defined as A dBm for detection of the W MHz PPDU, A+3 dBm for detection of the 2 W MHz PPDU, A+6 dBm for detection of the 4 W MHz PPDU, and A+9 dBm for detection of the 8 W MHz PPDU)). If the TXOP is allowed as a result of the first backoff process, the processor 11 may transmit the data unit having a size greater than or equal to the first channel width (e.g., the PPDU having a channel width greater than or equal to W MHz), using the transceiver 13.

In addition, when transmission of a data unit having a size greater than or equal to a third channel width (e.g., a PPDU having a channel width greater than or equal to 2 W MHz, 4 W MHz or 8 MHz) is intended, the processor 11 may perform a second backoff process on the second primary channel having the size of a fourth channel width less than or equal to the third channel width (e.g., the 2 W MHz primary channel or a W MHz primary channel), using a second CCA condition (e.g., a CCA threshold set of Type2 (i.e., a set defined as A+3 dBm for detection of the W MHz PPDU, A+6 dBm for detection of the 2 W MHz PPDU, and A+9 dBm for detection of the 4 W MHz PPDU, A+12 dBm for detection of the 8 W MHz PPDU)). If the TXOP is allowed as a result of the second backoff process, the processor 11 may transmit the data unit having a size greater than or equal to the third channel width (e.g., the PPDU having a channel width greater than or equal to 2 W MHz, 4 W MHz or 8 MHz), using the transceiver 13.

The specific configuration of the apparatus described above may be implemented such that the above-described embodiments can be independently applied or two or more thereof can be simultaneously applied, and description of redundant parts is omitted for clarity.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention disclosed in the appended claims. Thus, the present invention is not intended to be limited to the embodiments described herein, but is intended to accord with the widest scope corresponding to the principles and novel features disclosed herein.

INDUSTRIAL APPLICABILITY

Various embodiments of the present invention have been described through an IEEE 802.11 system, but they may also be applied to various mobile communication systems.

The invention claimed is:

1. A method for performing a backoff process by a station (STA) in a wireless Local Area Network (WLAN) system supporting a plurality of primary channels, the method comprising:
performing a backoff process on a primary 1 MHz channel or a primary 2 MHz channel, selectively, according to a width of a physical layer protocol data unit (PPDU); and
transmitting the PPDU when a transmission opportunity (TXOP) is allowed as a result of the backoff process,
wherein when the width of the PPDU is 1 MHz, the backoff process is performed on the primary 1 MHz channel using a first clear channel assessment (CCA) threshold from a first CCA condition,
wherein when the width of the PPDU is 2 MHz, 4 MHz, 8 MHz or 16 MHz, the backoff process is performed on the primary 2 MHz channel using a second CCA threshold from a second CCA condition, wherein the second CCA threshold used for the primary 2 MHz channel is higher than the first CCA threshold used for the primary 1 MHz channel,
wherein the primary 2 MHz channel is comprised of the primary 1 MHz channel and a secondary 1 MHz channel,
wherein a back-off timer corresponding to the primary 2 MHz channel is stopped while the primary 1 MHz channel is busy, and
wherein a 1 MHz PPDU transmission is allowed only on the primary 1 MHz channel even when the secondary 1 MHz channel is idle.

2. The method according to claim 1, wherein the second CCA threshold is 3 dBm higher than the first CCA threshold.

3. The method according to claim 1,
wherein, when the STA detects a first signal with a first power value which is greater than or equal to the first CCA threshold on the primary 1 MHz channel, the STA determines that the primary 1 MHz channel is busy, and
wherein, when the STA detects a second signal with a second power value which is greater than or equal to the second CCA threshold on the primary 2 MHz channel, the STA determines that the primary 2 MHz channel is busy.

4. The method according to claim 3,
wherein, when the primary 1 MHz channel is idle, a backoff timer corresponding to the primary 1 MHz channel decreases in each backoff slot, and
wherein, when the primary 2 MHz channel is idle, the backoff timer corresponding to the primary 2 MHz channel decreases in each backoff slot.

5. The method according to claim 1, wherein the TXOP is allowed when the backoff timer expires.

6. The method according to claim 1, wherein, when the TXOP is allowed as a result of the backoff process, and the width of the PPDU is 4 MHz, 8 MHz or 16 MHz, transmission of the PPDU is performed according to a state of one or more secondary channels.

7. The method according to claim 6, wherein, when the one or more secondary channels are busy, a new backoff process is performed.

8. The method according to claim 6, further comprising:
checking whether a secondary 2 MHz channel, a secondary 4 MHz channel and a secondary 8 MHz channel are idle during a predetermined inter-frame space (IFS) immediately before starting the TXOP, when the width of the PPDU is 16 MHz;
checking whether the secondary 2 MHz channel and the secondary 4 MHz channel are idle during the IFS immediately before starting the TXOP, when the width of the PPDU is 8 MHz; or
checking whether the secondary 2 MHz channel is idle during the IFS immediately before starting the TXOP, when the width of the PPDU is 4 MHz.

9. The method according to claim 1, further comprising:
receiving a frame including a channel width field, wherein the channel width field includes first information indicating an operating channel width for a basic service set (BSS) and second information indicating whether the primary 1 MHz channel is located at a lower side of the primary 2 MHz channel or at an upper side of the primary 2 MHz channel.

10. A station (STA) for performing a backoff process in a wireless Local Area Network (WLAN) system supporting a plurality of primary channels, the station comprising:
a processor that performs a backoff process on a primary 1 MHz channel or a primary 2 MHz channel, selectively, according to a width of a physical layer protocol data unit (PPDU); and
a transceiver that transmits a physical layer protocol data unit (PPDU) under control of the processor, when a transmission opportunity (TXOP) is allowed as a result of the backoff process,
wherein when the width of the PPDU is 1 MHz, the backoff process is performed on the primary 1 MHz channel using a first clear channel assessment (CCA) threshold from a first CCA condition,
wherein when the width of the PPDU is 2 MHz, 4 MHz, 8 MHz or 16 MHz, the backoff process is performed on the primary 2 MHz channel using a second CCA threshold from a second CCA condition, wherein the second CCA threshold used for the primary 2 MHz channel is higher than the first CCA threshold used for the primary 1 MHz channel,
wherein the primary 2 MHz channel is comprised of the primary 1 MHz channel and a secondary 1 MHz channel, wherein a back-off timer corresponding to the primary 2 MHz channel is stopped while the primary 1 MHz channel is busy, and wherein a 1 MHz PPDU transmission is allowed only on the primary 1 MHz channel even when the secondary 1 MHz channel is idle.

11. The station according to claim 10, wherein the second CCA threshold from the second CCA condition is 3 dBm higher than the first CCA threshold from the first CCA condition.

12. The station according to claim 10, wherein the processor:

checks whether a secondary 2 MHz channel, a secondary 4 MHz channel and a secondary 8 MHz channel are idle during a predetermined inter-frame space (IFS) immediately before starting the TXOP, when the width of the PPDU is 16 MHz;

checks whether the secondary 2 MHz channel and the secondary 4 MHz channel are idle during the IFS immediately before starting the TXOP, when the width of the PPDU is 8 MHz; or checks whether the secondary 2 MHz channel is idle during the IFS immediately before starting the TXOP, when the width of the PPDU is 4 MHz.

13. The station according to claim 10, wherein the processor controls the transceiver to receive a frame including a channel width field, wherein the channel width field includes first information indicating an operating channel width of a basic service set (BSS) and second information indicating whether the primary 1 MHz channel is located at a lower side of the primary 2 MHz channel or at an upper side of the primary 2 MHz channel.

14. The station according to claim 10, wherein the station is either a non-access point station or an access point station.

* * * * *